United States Patent [19]

Funahashi et al.

[11] Patent Number: 5,896,774
[45] Date of Patent: Apr. 27, 1999

[54] ACTUATING MECHANISM

[75] Inventors: Akira Funahashi; Michihiro Iwata, both of Sakai, Japan

[73] Assignee: Minolta Co., Ltd., Osaka, Japan

[21] Appl. No.: 08/854,669

[22] Filed: May 12, 1997

Related U.S. Application Data

[62] Division of application No. 08/586,480, Jan. 16, 1996, Pat. No. 5,697,263, which is a continuation of application No. 08/175,307, Dec. 29, 1993, abandoned.

[30] Foreign Application Priority Data

Jan. 5, 1993 [JP] Japan .................................. 5-000196

[51] Int. Cl.[6] ......................................................... F16H 3/34
[52] U.S. Cl. ........................................... 74/353; 74/354
[58] Field of Search ................................ 74/665 G, 353, 74/354; 475/151, 305; 396/132, 411, 418

[56] References Cited

U.S. PATENT DOCUMENTS

| | | | |
|---|---|---|---|
| 3,686,974 | 8/1972 | Little, Jr. ............................... | 74/353 |
| 5,094,116 | 3/1992 | Shintani ................................ | 74/354 |
| 5,220,370 | 6/1993 | Hawai et al. . | |
| 5,365,301 | 11/1994 | Sugita et al. ......................... | 74/353 |
| 5,499,777 | 3/1996 | Ahn ........................................ | 74/354 |
| 5,628,041 | 5/1997 | Ezawa ................................... | 396/418 |

FOREIGN PATENT DOCUMENTS

| | | |
|---|---|---|
| 55-103544 | 7/1980 | Japan . |
| 55-98727 | 7/1980 | Japan . |
| 57-161845 | 10/1982 | Japan . |
| 59/103034 | 6/1984 | Japan ................................. 74/354 |
| 6-275735 | 2/1987 | Japan . |
| 1-287648 | 11/1989 | Japan . |
| 3-208033 | 9/1991 | Japan . |
| 4-225338 | 8/1992 | Japan . |
| 5-127236 | 5/1993 | Japan . |
| 2171809 | 9/1986 | United Kingdom . |

Primary Examiner—Charles A. Marmor
Assistant Examiner—Sherry Lynn Estremsky
Attorney, Agent, or Firm—Burns, Doane, Swecker & Mathis, LLP

[57] ABSTRACT

A device, having a planetary gear and a single motor, in use for switching and transmitting a driving force of the motor to any one of station gears and for driving each station gear in both rotational directions. The operation of locking levers for preventing a planetary gear from revolving around a sun gear is controlled by a cam. The cam is actuated by a driving force of the motor. A spring frictionally connecting the cam and an output shaft of a speed reduction system is interposed therebetween, and a magnet is disposed so as to restrict the movement of the cam when the motor rotates. A sun gear is connected with the output shaft of the speed reduction system with a "play" or gap in order that the rotation of the sun gear is reversed behind time corresponding to the play when the rotation of the motor is reversed, thus making it possible to start actuating the cam earlier than the sun gear for making sure that the locking levers are shifted.

23 Claims, 36 Drawing Sheets

ACTUATING MECHANISM

This application is a divisional of Ser. No. 08/586,480, filed on Jan. 16, 1996, now U.S. Pat. No. 5,697,263, which, in turn, is a continuation of Ser. No. 08/175,307, filed on Dec. 29, 1993, now abandoned.

BACKGROUND OF THE INVENTION

1. Field of the Invention

The present invention generally relates to an actuating mechanism able to accomplish a plurality of different works independently by the operation of a single motor, and particularly relates to the actuating mechanism for switching and transmitting a driving force to a desired mechanism provided in a camera.

2. Description of the Related Arts

Conventionally, there have been provided some types of actuating mechanisms. Taking actuating mechanisms shown in Japanese Laid-Open Patent (Unexamined) Publication Nos. 1-287648 and 3-208033 (FIGS. 8–11 in particular) for examples, a sun gear is connected to an output shaft of a motor, planetary gears are revolved around the sun gear, and a driving force can be switched and transmitted to any desired one of driving stations via one of the planetary gears.

In the former conventional art, a plurality of planetary gears is provided in one-to-one correspondence to respective station gears; namely, there are provided planetary gears equal in number to the station gears. Furthermore, the actuating mechanism is constructed so that one rotational direction of the motor makes each planetary gear revolve, while the other rotational direction thereof makes each planetary gear rotate on its axis. Accordingly, it is only in one direction that each planetary gear can rotate on its axis, and it is not possible to transmit to each station gear the driving force enabling it to rotate in both directions.

In the latter conventional art, it is possible to drive each station gear in both rotational directions, because the revolution of one planetary gear can lead to switching from one station gear to another, and because the movement of its planetary carrier is restrained with the planetary gear engaging the station gear. However, because the restraint or unrestraint of the planetary carrier with respect to each station gear is performed by using a driving source different from one for driving the actuating mechanism itself, and because a large power is required to move the restraining member on which a load due to the driving is imposed and to overcome its friction, a large and expensive plunger must be used in the actuating mechanism. Employing such a large and expensive plunger acts as a disadvantage in providing a smaller and cheaper actuating mechanism.

SUMMARY OF THE INVENTION

It is accordingly an object of the present invention to provide a compact and inexpensive actuating mechanism by using a simple and less expensive magnet instead of a large-scale plunger, in which each desired station gear can be driven in both rotational directions.

In accomplishing this and other objects of the present invention, there is provided an actuating mechanism comprising: a driving source with a driving shaft able to rotate in both rotational directions; a sun gear driven by the driving shaft; a planetary gear, engaging with the sun gear, which can select either condition from a first condition in which it revolves around the sun gear and a second condition in which it rotates on its axis at a desired position along an orbital path taken around the sun gear; at least one transmission gear, located along the orbital path of the planetary gear, which can engage with the planetary gear; first control means for switching between a first state in which the planetary gear is allowed only to rotate on its axis but is not allowed to revolve around the sun gear and a second state in which the planetary gear is allowed to revolve around the sun gear; second control means, driven by the driving shaft, for switching the first control means between the first and second state; and a magnet for switching the second control means between a condition in which a movement of the second control means is restrained and a condition in which the movement thereof is not restrained, in order to keep the first control means in either state selected from the first and second state.

According to the above mechanism, the planetary gear switches and transmits the driving force of the driving source to a desired transmission gear by which each particular system is actuated. The driving source is used, for example, is a motor rotatable in two rotational directions. When the planetary gear gets the driving force from the driving source via the sun gear, and it rotates on its axis, the desired transmission gear is driven by receiving the driving force. In transmitting the driving force, if the sun gear rotates, for example, clockwise, the planetary gear also starts revolving clockwise around the sun gear. Accordingly, unless the planetary gear rotates on its axis with its revolution around the sun gear being prevented, it is not possible to keep transmitting the driving force to the particular transmission gear. The first control means prevents the planetary gear from revolving round the sun gear when the driving force is transmitted to the transmission gear, whereas the first control means allows the planetary gear to revolve round the sun gear when the transmission gear is switched from one to another. The timing of the movement of the first control means is controlled by the second control means which is actuated by receiving the driving force from the driving source. That is, the driving source for driving the planetary gear is used as the driving source for driving the second control means. The magnet restricts the movement of the second control means by magnetically attracting the second control means when the shaft of the driving source is rotating, whereas the magnet releases the movement of the second control means in case of operating the second control means. The magnet is smaller and more inexpensive than a plunger device, thus making the actuating mechanism smaller and manufactured at a lower cost.

In the above mechanism, frictional connecting means can be provided between the driving shaft and the second control means. Under the construction, the frictional connecting means slips when the movement of the second control means is restrained, thus preventing the driving force from being transmitted from the driving source to the second control means, whereas the frictional connecting means transmits the driving force to the second control means when the movement of the control means is not restrained.

Preferably, the sun gear is connected to the driving shaft of the driving source with a predetermined play or gap, by which the sun gear is driven behind time corresponding to the play when the rotational direction of the driving shaft is changed. According to this mechanism, the driving force is not transmitted to the sun gear, the planetary gear or the transmission gear until the sun gear starts to reverse its rotational direction. In other words, the second control means never fails to start moving earlier than the sun gear, and the first control means is actuated when the sun gear and the planetary gear are free from the driving shaft.

Between the driving shaft and the sun gear is provided a speed-reduction system. By employing a planetary gear train for the speed-reduction system, and by integrating its peripheral ring gear and the second control means, it is possible to simplify the actuating mechanism in construction.

The driving force of the driving source can be utilized to drive the second control means or to drive the sun gear by limiting the movement of the peripheral ring gear to a certain range. That is, when the movement of the peripheral ring gear is restricted, the sun gear is driven, because the driving load of the ring gear with respect to the driving source is immense in magnitude. On the other hand, when the driving load of the sun gear is larger than that of the peripheral ring gear within limit that the ring gear can rotate, the ring gear or the second control means is actuated.

BRIEF DESCRIPTION OF THE DRAWINGS

This and other objects and features of the present invention will become clear from the following description taken in conjunction with the preferred embodiments thereof with reference to the accompanying drawings, in which.

DETAILED DESCRIPTION OF THE INVENTION

Figure 1:
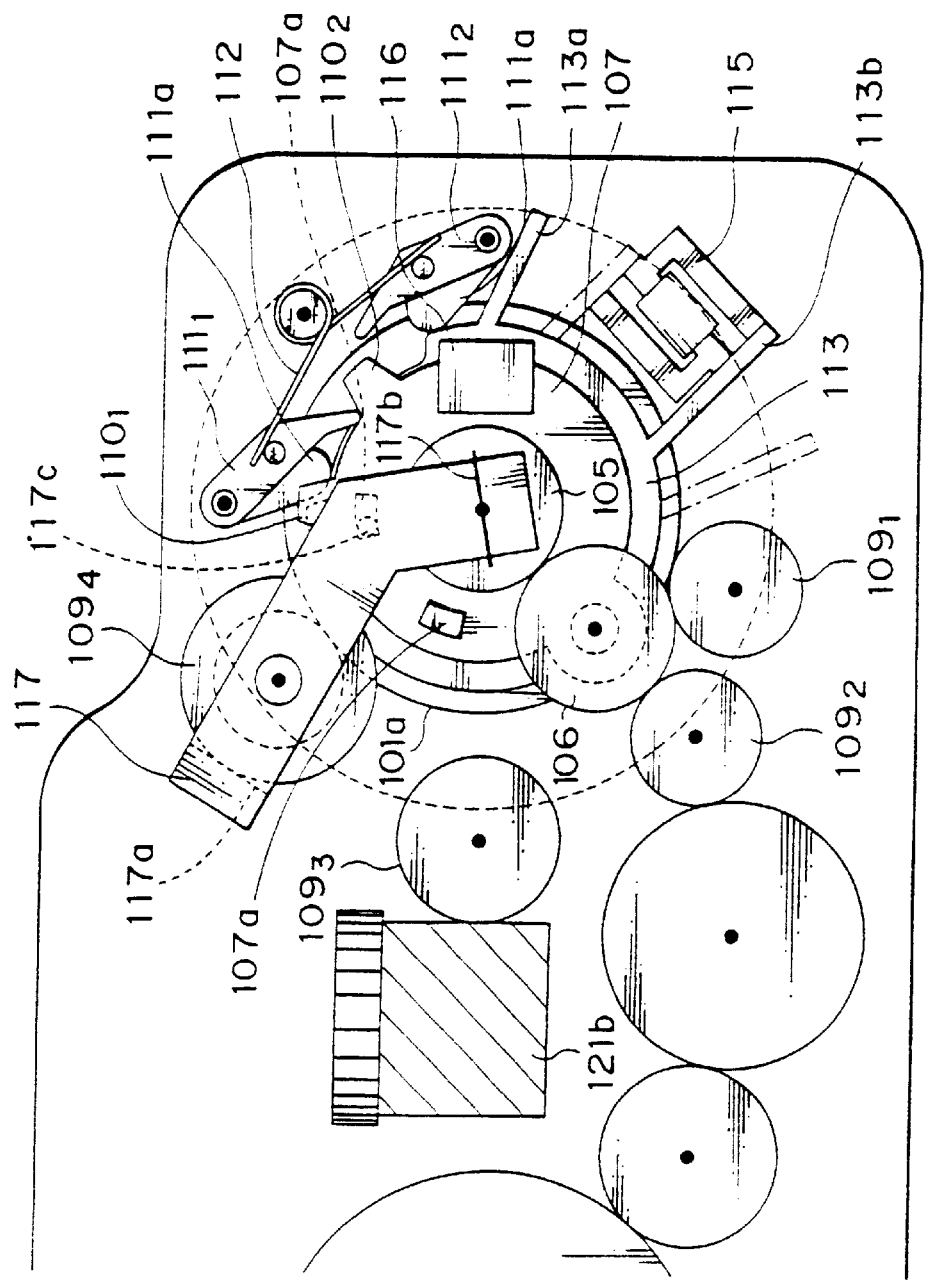
FIG. 1 is an explanatory bottom view showing an actuating mechanism according to a first embodiment of the present invention.

Before the description of the present invention proceeds, it is to be noted that like parts are designated by like reference numerals throughout the accompanying drawings.

Figure 2:
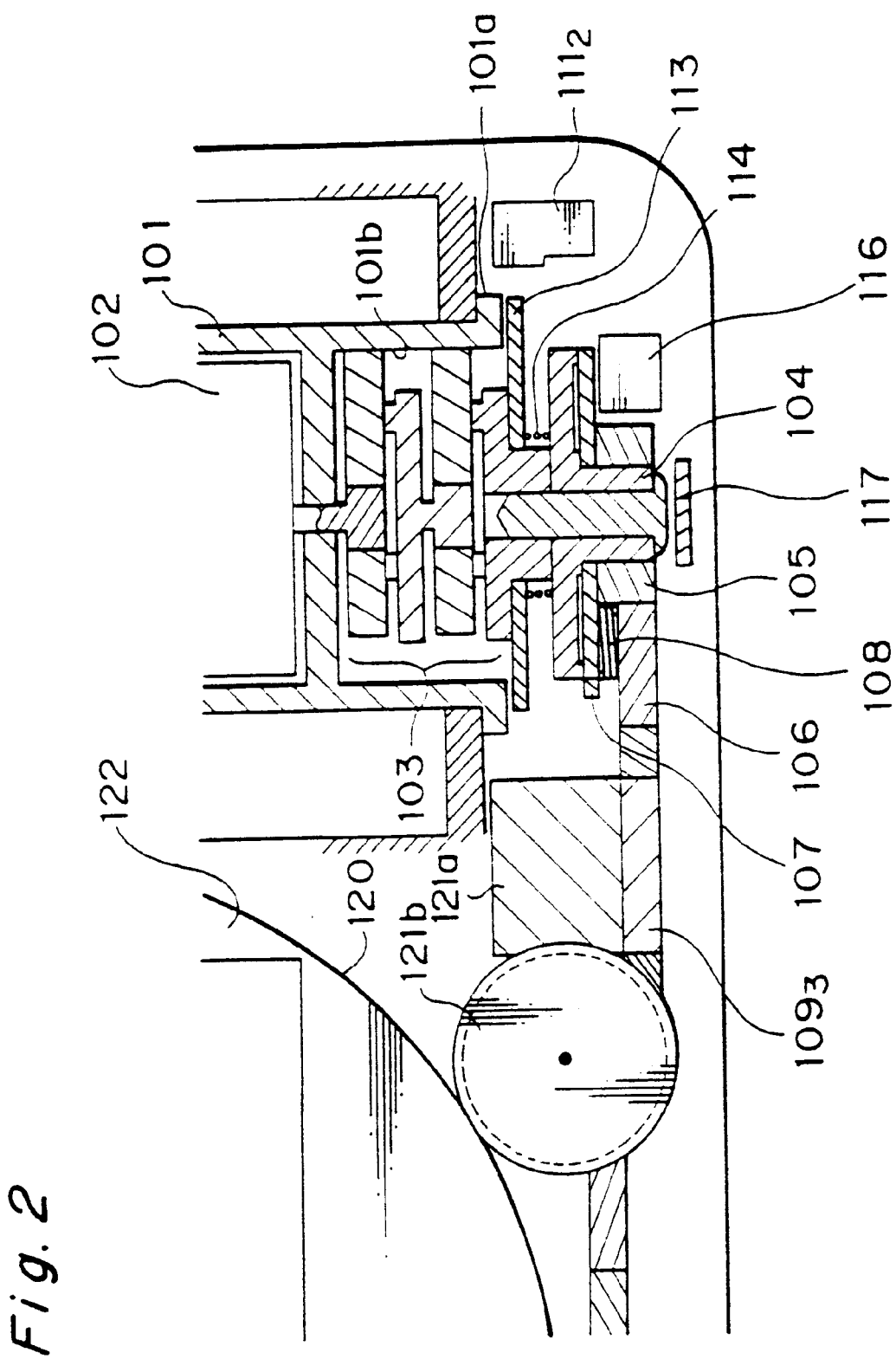
FIG. 2 is a vertical sectional view of the actuating mechanism shown in FIG. 1.

FIG. 1 is an explanatory view showing an actuating mechanism according to a first embodiment of the present invention, which is viewed from the bottom of a camera, and FIG. 2 is a vertical sectional view showing the actuating mechanism of FIG. 1. A major portion of the actuating mechanism is disposed inside and below a film take-up spool 101. The spool 101 will be referred as camera-spool 101 or, simply, spool 101, hereinafter. A motor 102 serving as a driving source is accommodated inside the spool 101. The output shaft projecting downward of the motor 102 is connected with a speed-reduction system 103 which comprises a train of planetary gears disposed in two-stage vertically. There is provided, on an output shaft 104 of the speed-reduction system 103, a planetary gear mechanism serving as a switching mechanism for switching one driving force to different station gears, each of which constitutes a driving force transmitting system according to the present embodiment. The planetary gear mechanism comprises a sun gear 105, a planetary gear 106 engaging the sun gear 105 and a carrier 107 on which the planetary gear 106 is installed via a spring 108 as shown in FIG. 2. Friction is generated between the planetary gear 106 and the carrier 107; accordingly, the planetary gear 106 rotates round the sun gear 105 unless a rotation-preventing force is exerted upon the carrier 107. The rotation of the planetary gear 106 around the sun gear 105 makes it possible to switch one driving force to different station gears in the driving force transmitting system. When the sun gear 105 rotates with a condition that the rotation of the planetary gear 106 around the sun gear 105 is prohibited, the planetary gear 106 rotates on its axis, transmitting its rotation to the driving force transmitting system. The planetary gear 106 can rotate on its axis both clockwise and counterclockwise, enabling to make the driving force transmitting system perform two kinds of operations as will be described later.

Station gears $109_1$–$109_4$ are disposed along the orbit of the planetary gear 106 so that the station gears $109_1$–$109_4$ serve as input terminals for transmitting the driving force from the motor 102 via the sun gear 105 and the planetary gear 106 to a mechanism for winding a film, a mechanism for rewinding the film, a mechanism for moving photographing lens back and forth, and other mechanisms.

Figure 3:
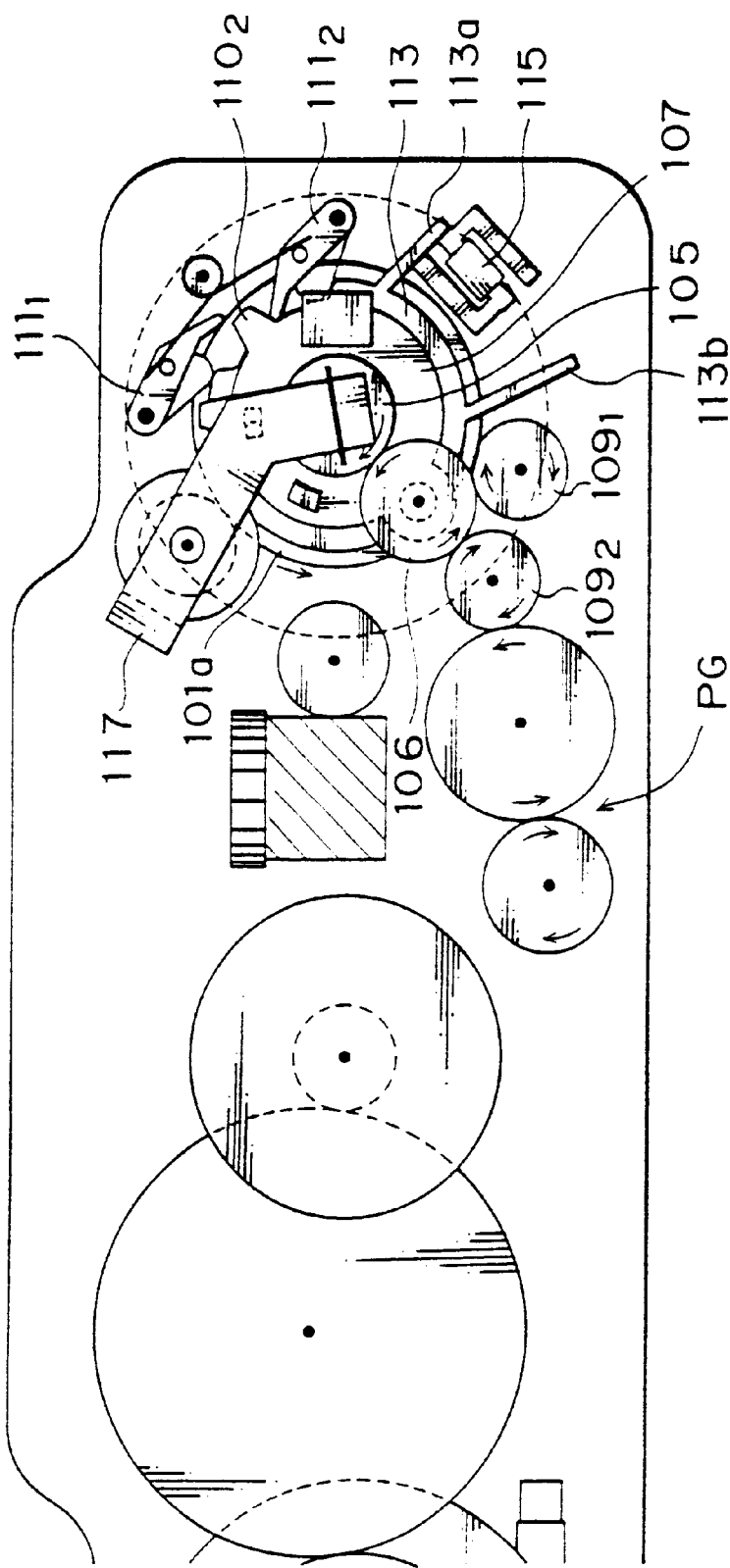
FIG. 3 is an explanatory bottom view of the actuating mechanism shown in FIG. 1 in which a film is being wound at a high speed.
Figure 4:
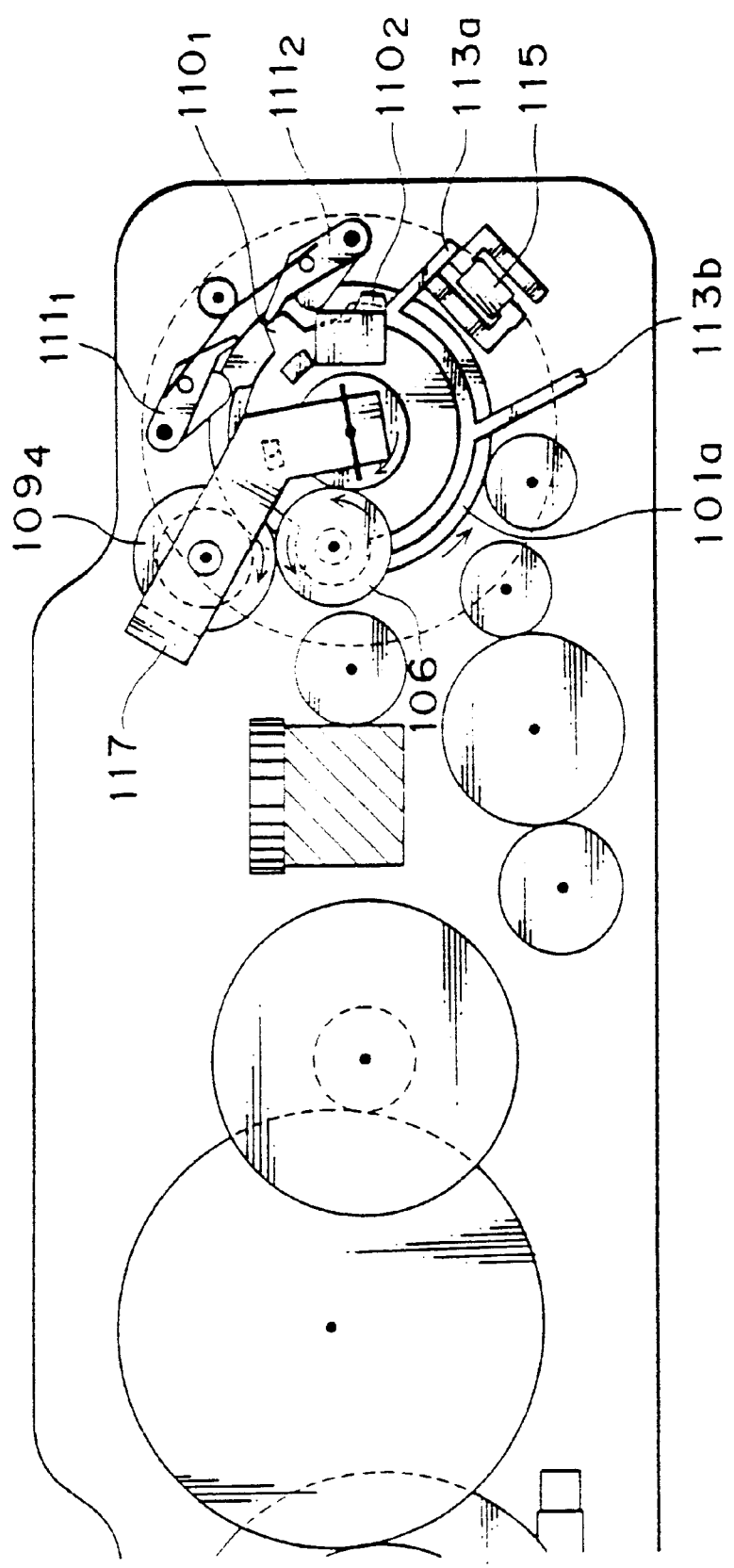
FIG. 4 is an explanatory bottom view of the actuating mechanism shown in FIG. 1 in which the film is being wound at a low speed.

This camera has the actuating mechanism in which the spool 101 can be rotated in a low speed driving mode and a normal speed driving (high speed) mode. The low speed mode thereof is selected when it is necessary to transmit the driving force of the motor 102 to the spool 101 at a large speed-reduction ratio. This low speed mode is selected in winding the film, for example, when the output voltage of the power source driving the motor 102 starts dropping down, when temperature is low, or when it is necessary to feed out the film from a film cartridge with a bigger fiction force. Referring to FIGS. 3 and 4, the driving force from the motor 102 is transmitted via the station gear $109_1$ or $109_4$ to a spool gear 101a formed on the peripheral surface of the lower end portion of the spool 101. The station gear $109_1$ is a first spool-driving gear for rotating the spool 101 at a high speed, whereas the station gear $109_4$ is a second spool-driving gear for rotating the spool 101 at a low speed. The station gear $109_4$ is constructed to be a double-gear for speed reduction. In this construction, the planetary gear 106 engages its larger gear of the station gear $109_4$ or disengages therefrom, and a smaller gear of the station gear $109_4$ is always in engagement with the spool gear 101a. The station gears $109_1$ and $109_4$ are disposed at both ends of the group gears $109_1$–$109_4$ around the sun gear 105 as shown in FIG. 1.

In the gear mechanism for driving the spool 101, the driving force from the motor 102 is transmitted to the spool gear 101a via the sun gear 105 installed on the output shaft 104 of the speed-reduction system 103, the planetary gear 106, and the station gear $109_1$ or $109_4$. As shown in FIG. 2, an internal ring gear 101b is formed on the inner surface of the lower end of the spool 101. This functions as a peripheral side gear of the speed-reduction system 103 with respect to three planetary gears disposed vertically in triple-stair. That is, the internal ring gear 101b is not a gear fixed, but a gear rotatable. The speed-reduction system 103 thus comprising the planetary gear train and rotatable ring gear is able to provide a greater speed-reduction ratio than a speed-reduction gear system comprising gears having the same number of teeth and a fixed ring gear. In addition, the speed-reduction system 103 can be accommodated inside the spool 101, thus allowing the camera to be shorter and compact. In a conventional speed-reduction gear system having a fixed ring gear, in order to accommodate the fixed ring gear inside a spool, it is required to make the diameter of the fixed ring gear smaller than that of the rotatable ring gear according to the present embodiment by the thickness of the fixed ring gear, namely, to make the speed-reduction gear ratio smaller or to make the diameter of the spool larger.

Figure 5:
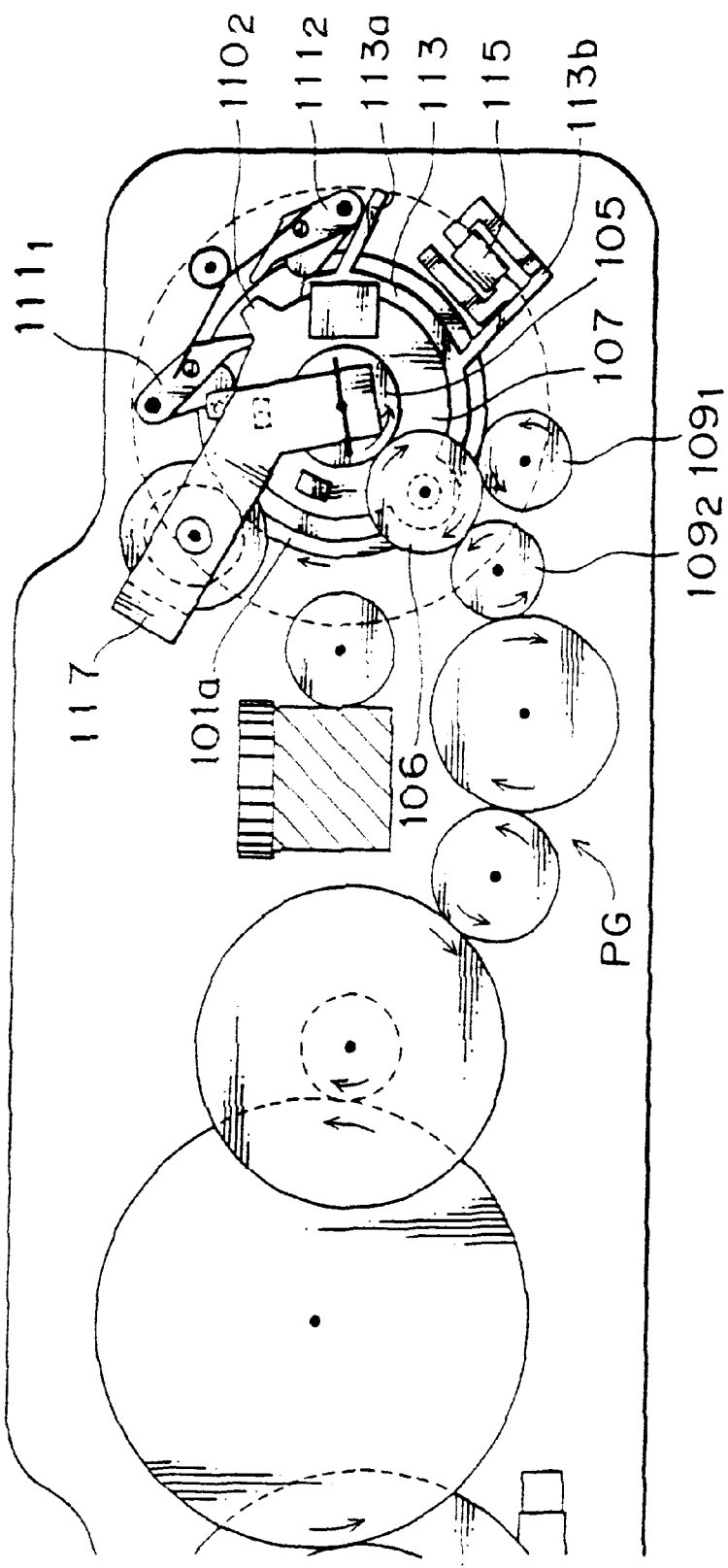
FIG. 5 is an explanatory bottom view of the actuating mechanism shown in FIG. 1 in which the film is being rewound.
Figure 34:
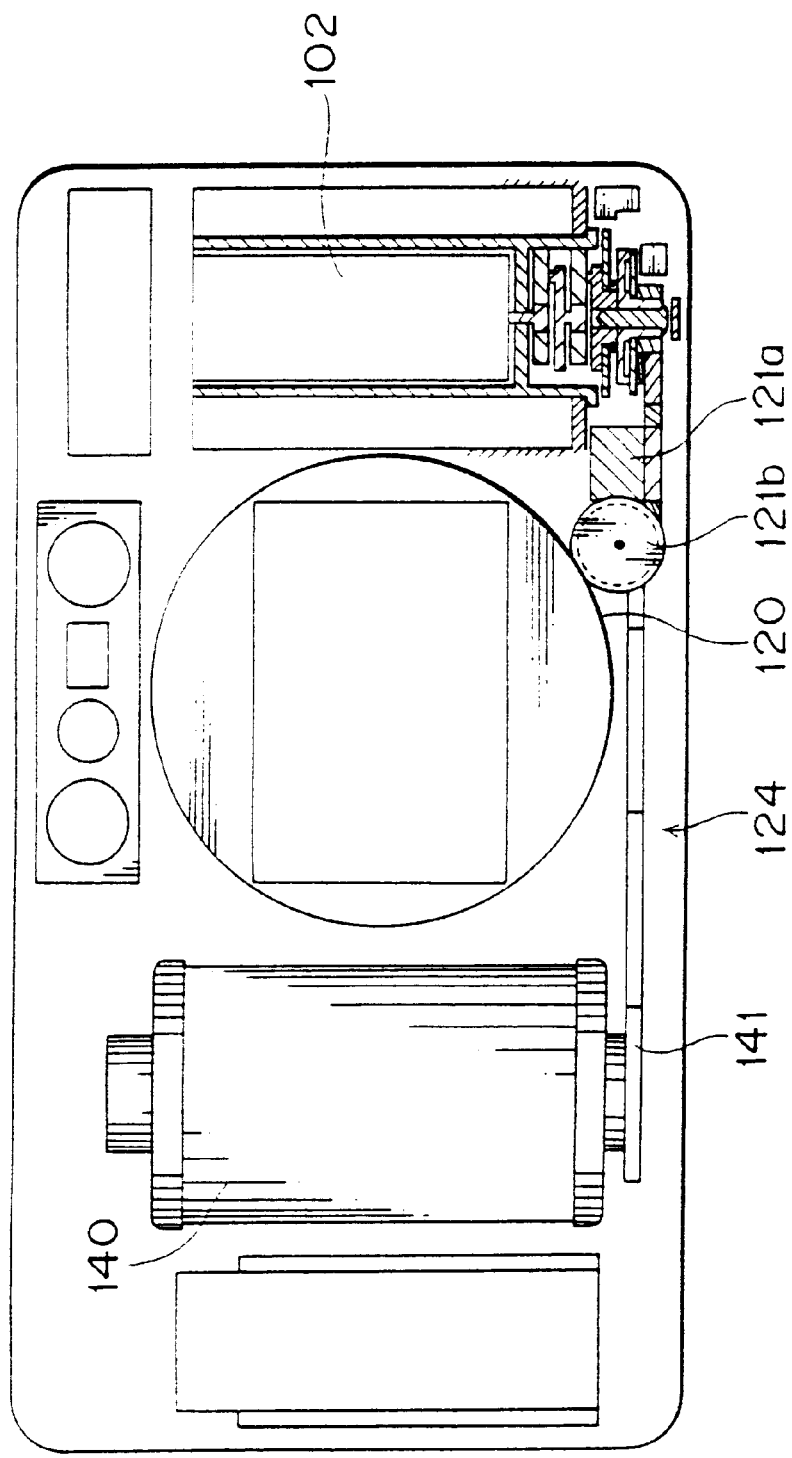
FIG. 34 is a front view showing the relationship between the actuating mechanism of FIG. 1 and the camera.
Figure 35:
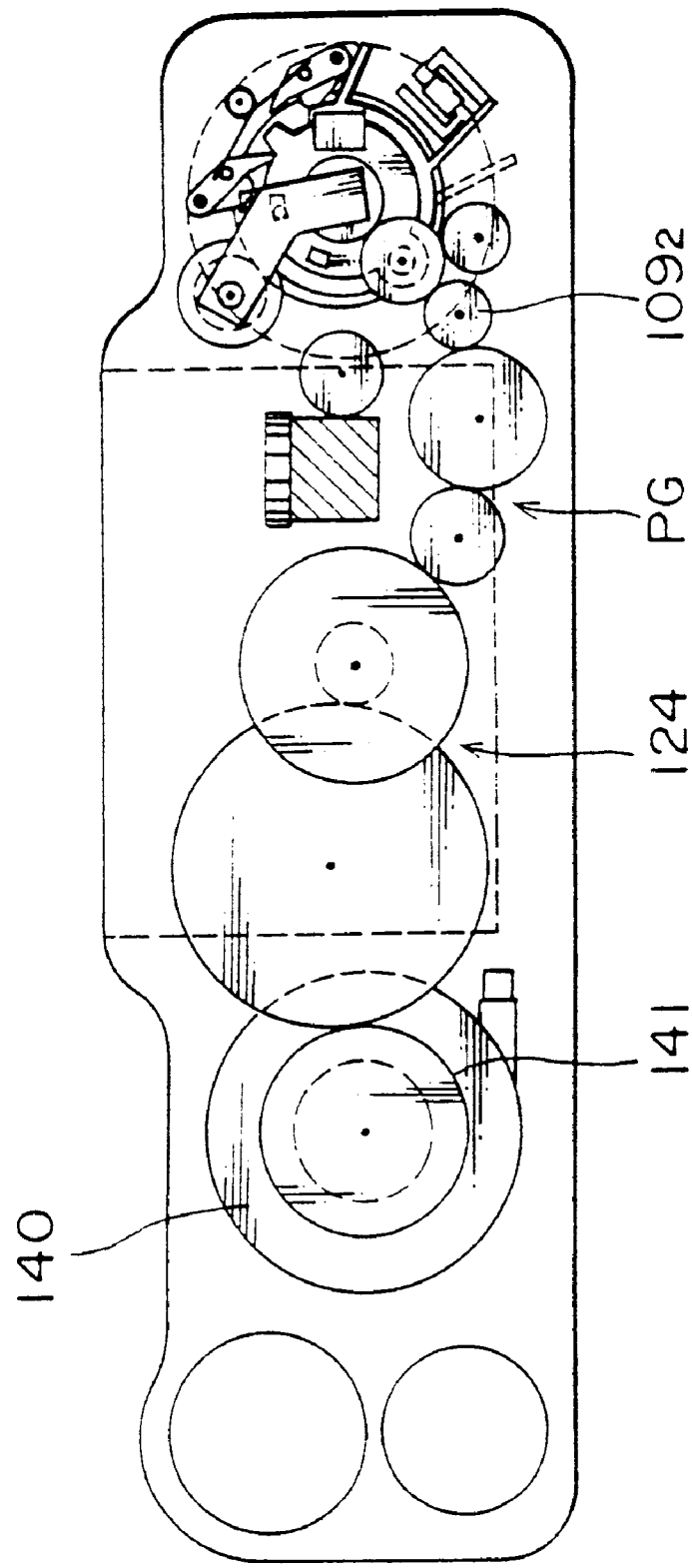
FIG. 35 is a bottom view showing the relationship between the actuating mechanism of FIG. 1 and the camera.

The station gear $109_2$ transmits the driving force from the motor 102 to a film-rewinding system 124. In the state that the planetary gear 106 engages the station gear $109_2$, the planetary gear 106 also engages the station gear $109_1$. As a result, the spool 101 is driven at a high speed both in film-winding and film-rewinding directions. As shown in FIGS. 3 and 5, a clutch mechanism constructed from another planetary gear mechanism PG is installed in the camera, by which only when the film is rewound, i.e., when the planetary gear 106 rotates clockwise on its axis, the driving force from the motor 102 is transmitted to the film-rewinding system 124. The gear train of the film-rewinding system 124 is shown in FIGS. 34 and 35. Reference numeral 140 denotes a film cartridge, and 141 denotes a gear connected with a fork (not shown) for driving the spool of the cartridge 140.

Generally, as regards the type of a camera in which a film tension is released by loosening the film winding on a camera-spool when rewinding the film by driving both the camera-spool and a cartridge-spool, conditions that the speed-reduction ratio in the rewinding system must satisfy are the following two conditions:

(a) a first condition under which it is possible to rewind the film even if the power output of the battery for driving the motor drops down, even if the camera is used under a low-temperature environment, even if the resistance to rewinding the film is larger, etc., and (b) a second condition that the speed of the film fed out from the camera spool is larger than the speed of the film wound around the cartridge-spool. Generally, because larger speed-reduction ratio is required in condition (b) than in condition (a), the speed-reduction ratio meeting the condition (b) is necessarily applied to the rewinding system installed in the conventional camera. This means that the speed of rewinding the film is slower than that which can be achieved by the motor. According to the embodiment of the present invention, however, the film-rewinding mechanism has two rewinding modes as mentioned above; therefore, it is possible to rotate the camera-spool 101 faster than the cartridge-spool. Consequently, even if the speed-reduction ratio is set in accordance with the abovementioned condition (a), the condition (b) is satisfied, because the camera-spool is rotating faster than the cartridge-spool. In other words, this camera has an ability of high-speed film rewinding.

Figure 6:
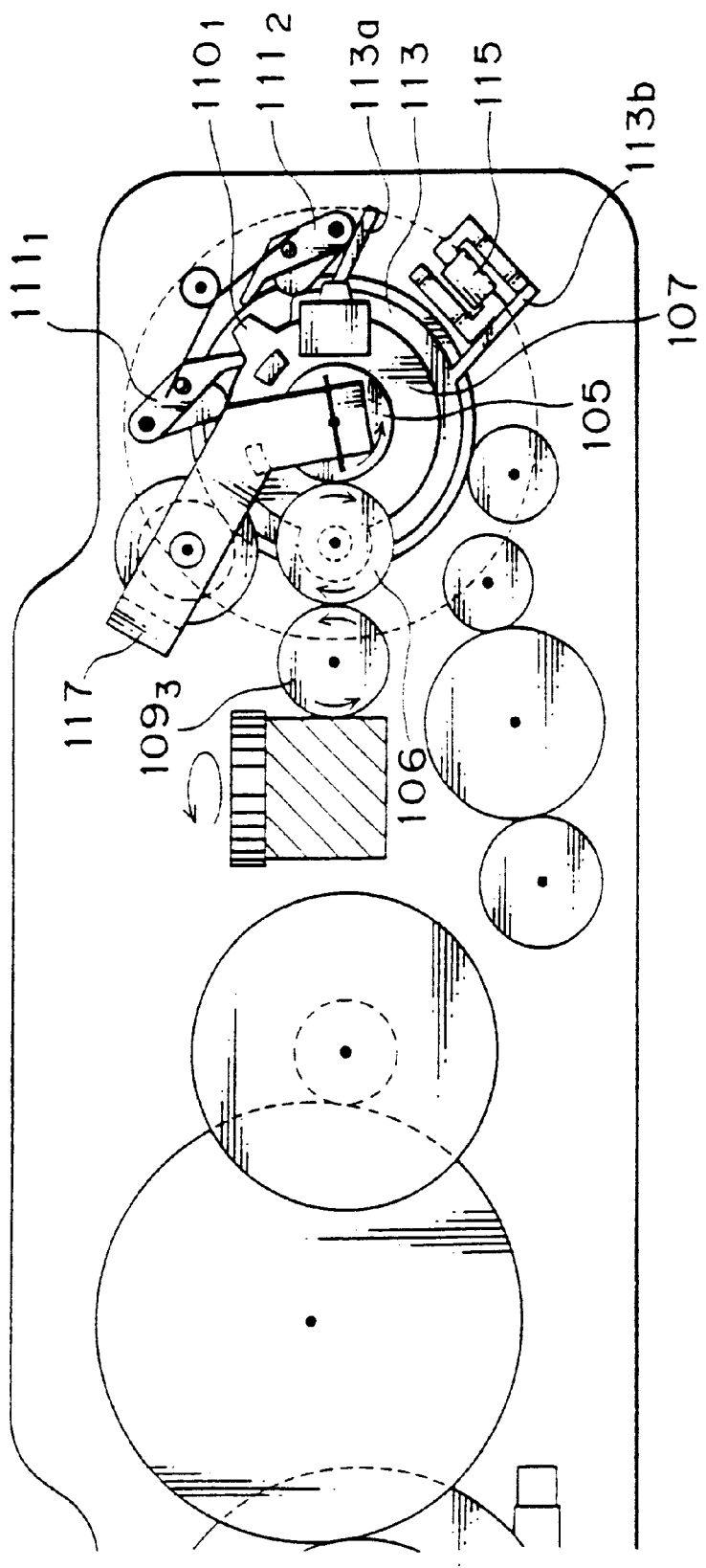
FIG. 6 is an explanatory bottom view of the actuating mechanism shown in FIG. 1 in which zooming operation is performed.
Figure 7:
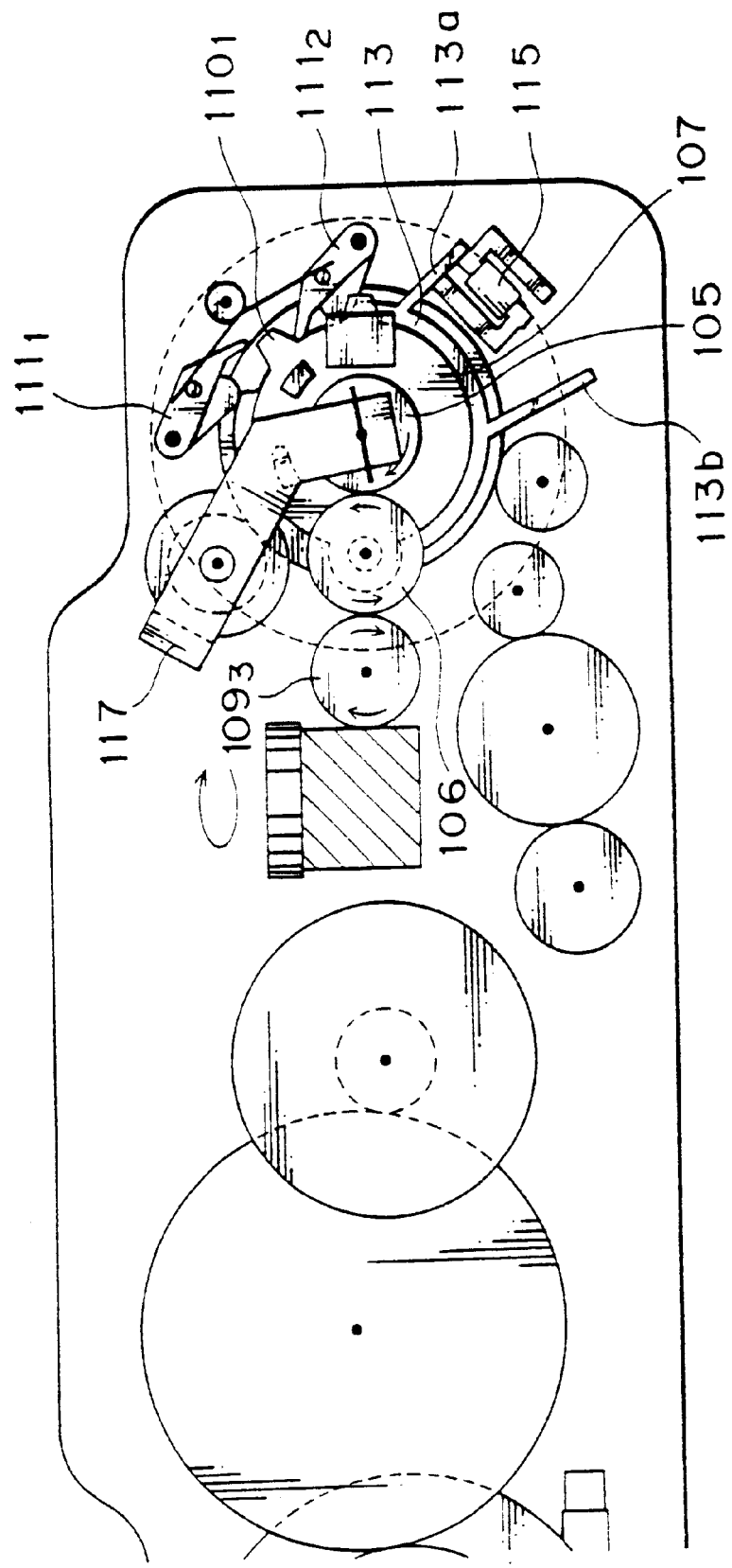
FIG. 7 is an explanatory bottom view of the actuating mechanism shown in FIG. 1 in which zooming operation is performed.

The station gear $109_3$ transmits the driving force from the motor 102 to a driving system for moving a photographic lens barrel 122 back and forth along the optical axis. A pair of screw gears 121a and 121b is interposed between the station gear $109_3$, and a gear 120 (see FIG. 2) formed on a rotary ring disposed round the periphery of the lens barrel 122. The rotational axes of the screw gears 121a and 121b are differentiated by 90° from each other. The speed-reduction ratio between the screw gears 121a and 121b is set to a value required for performing zooming operation. Under the state in which the planetary gear 106 is in engagement with the station gear $109_3$, when the planetary gear 106 rotates clockwise on its axis, zooming operation is switched from telescopic side to wide side, whereas when the planetary gear 106 rotates counterclockwise on its axis, zooming operation is switched from the wide side to the telescopic side as shown in FIG. 6 or 7. In any case, a locking lever $111_1$ or $111_2$ prevents the rotation of the carrier 107 so as to prevent the planetary gear 106 from rotating round the sun gear 105, as will be described later.

In the actuating mechanism, according to the embodiment, adopted in a camera of a type in which zooming operation is performed, backlash is got rid of by rotating the planetary gear 106 in the same direction before stopping in zooming operation. More specifically, for example, if it is constructed such that the lens barrel is moved from the wide side to the telescopic side, to prevent the lens barrel movement from the telescopic side to the wide side, the planetary gear 106 is rotated a little bit in such a rotational direction that the lens barrel is moved from the wide side to the telescopic side before stopping. Similarly, if it is constructed such that the lens barrel is moved from the telescopic side to the wide side, to prevent the lens barrel movement from the wide side to the telescopic side, the planetary gear 106 is rotated a little bit in such a rotational direction that the lens barrel is moved from the telescopic side to the wide side before stopping. In any case, when zooming operation is completed, the positional relationship between the planetary gear 106 and the station gear $109_3$ is as shown in FIG. 7. In this state, the film can be wound at any time. That is, in winding the film at a high speed after the shutter is released, the positional relationship between the planetary gear 106 and the station gear $109_3$ is changed from the state shown in FIG. 7 to that shown in FIG. 3 via the states shown in FIGS. 9 and 5. In winding the film at a low speed after the shutter is released, the positional relationship between the planetary gear 106 and the station gear $109_3$ is changed from the state shown in FIG. 7 to that shown in FIG. 4 via the states shown in FIGS. 6 and 10. In any case, FIGS. 5 and 6 show transitional states necessary only for the switchover, and the actual transmission of the driving force from the motor 102 to the driving force transmitting system is not performed.

Figure 8:
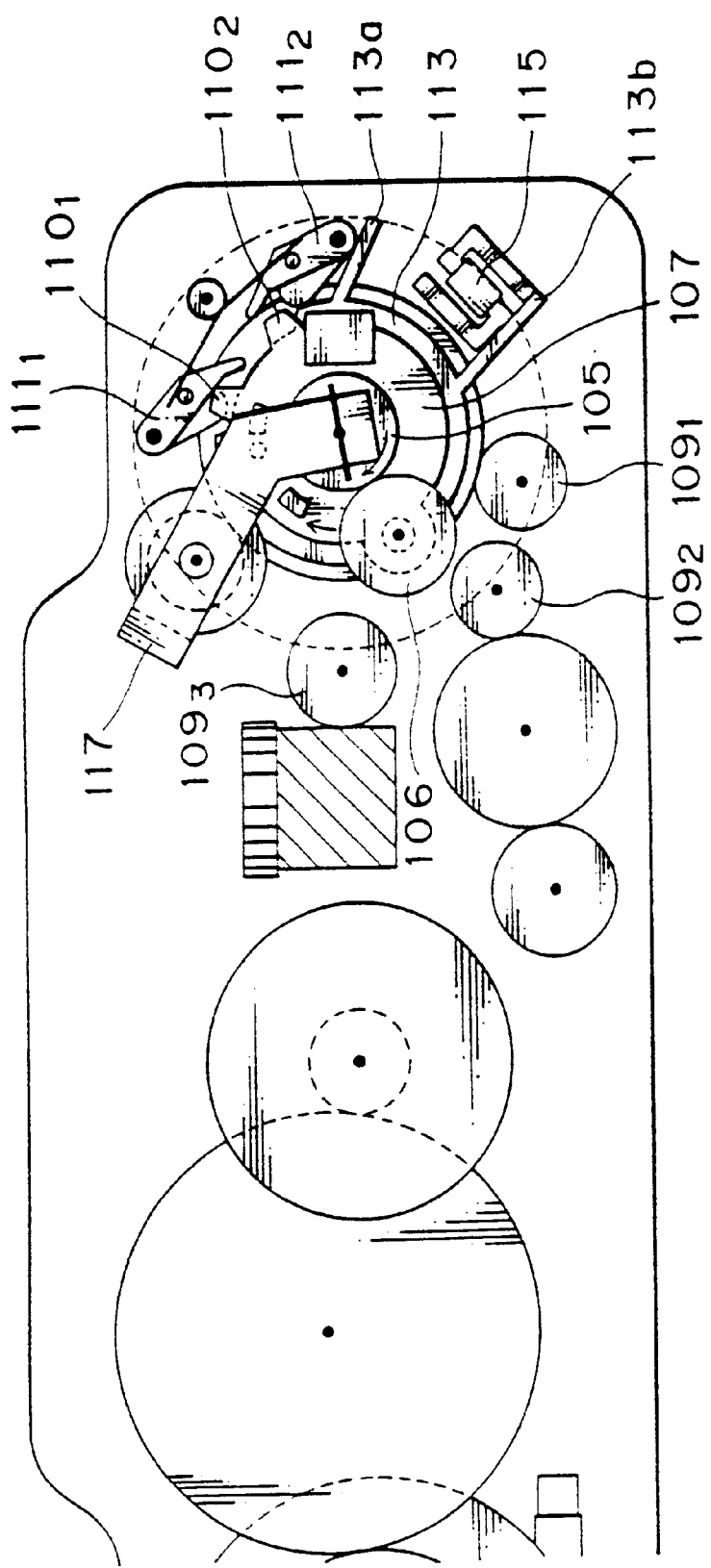
FIG. 8 is an explanatory bottom view of the actuating mechanism shown in FIG. 1 in which a planetary gear is rotating clockwise to switch the station.
Figure 9:
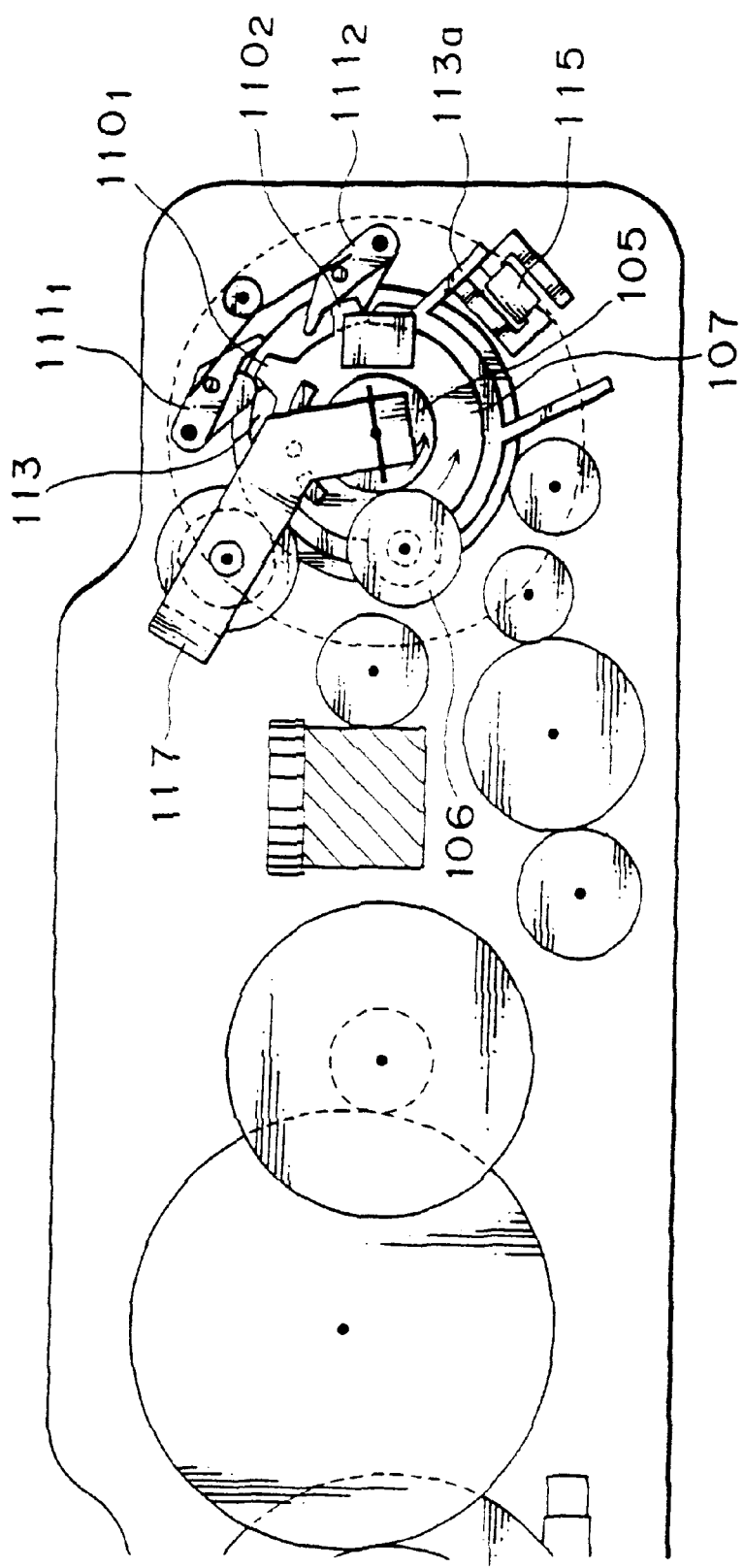
FIG. 9 is an explanatory bottom view of the actuating mechanism shown in FIG. 1 in which a planetary gear is rotating counter clockwise to switch the station.
Figure 10:
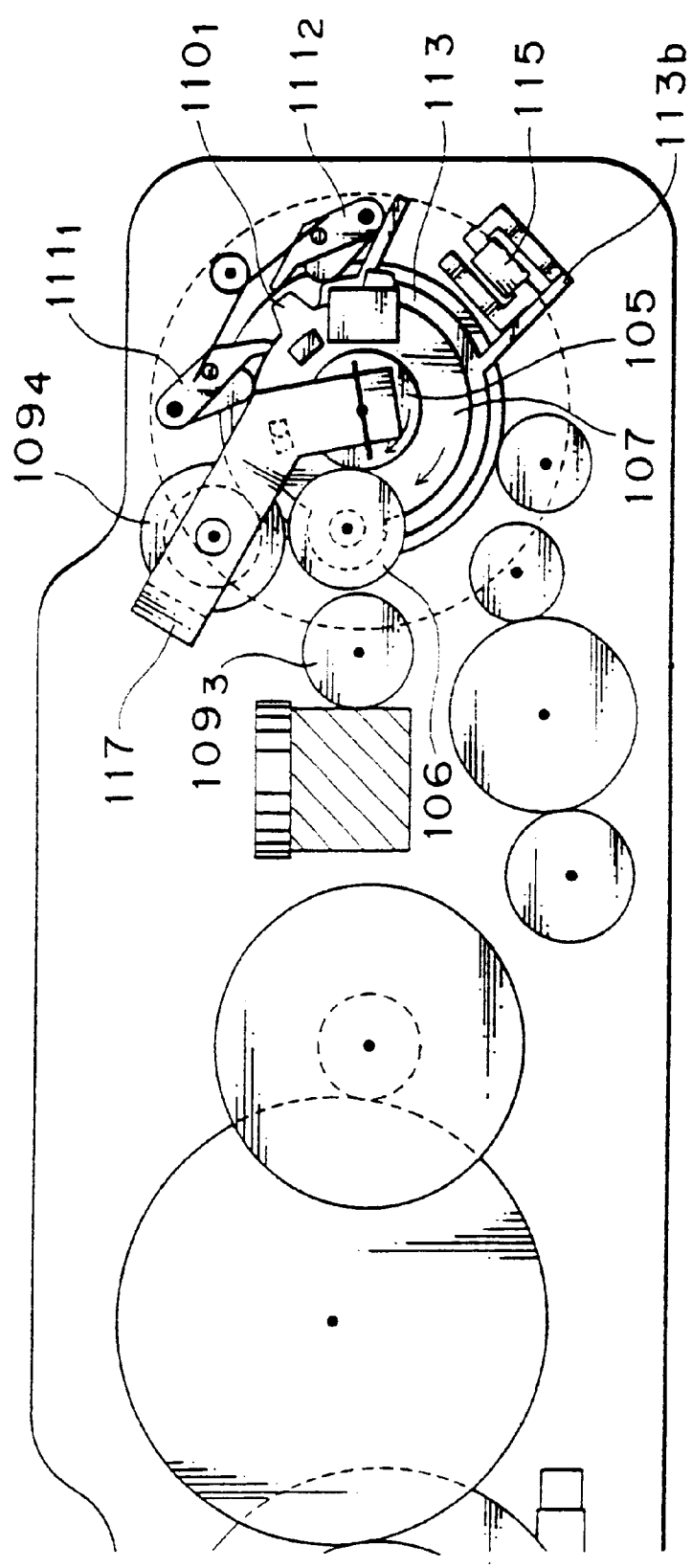
FIG. 10 is an explanatory bottom view of the actuating mechanism shown in FIG. 1 in which a planetary gear is rotating clockwise to switch the station.

As described above, the ring gear 101b of the speed-reduction system 103 is a rotatable gear disposed on the inner peripheral surface of the spool 101. Here, the spool 101 is in a floating state if this spool 101 is not restricted in motion except when the driving force of the motor 102 is transmitted to the spool gear 101a via the sun gear 105, the planetary gear 106, and each of the station gears $109_1$–$109_4$. With such a situation that the spool 101 is in a floating state, the spool 101 is carelessly rotated when the film wound around the spool 101 is loosened, or when the planetary gears of the speed-reduction system 103 revolve or rotate on their respective axes. Therefore, in order to keep the spool 101 from being in the floating state under the state that the driving force from the motor 102 is not transmitted to the spool; that is, the planetary gear 106 engages the station gear $109_3$ as shown in FIG. 6 or 7, or under the state that the planetary gear 106 moves round the sun gear 105 between the station gears 109 and $109_4$ as shown in FIG. 8, 9 or 10, the actuating mechanism is constructed in such a way that the internal ring gear 101b acts as a fixed gear by stopping the rotation of the station gear $109_4$. That is, only when the planetary gear 106 is in engagement with the station gear $109_1$ or $109_4$ (see FIGS. 3 through 5), the rotation of the spool 101 is permitted; and, the rotation of the spool 101 is prevented in other situations (see FIGS. 6 through 10) with the provision of a spool locking mechanism which prevents the rotation of the station gear $109_4$.

Figure 11:
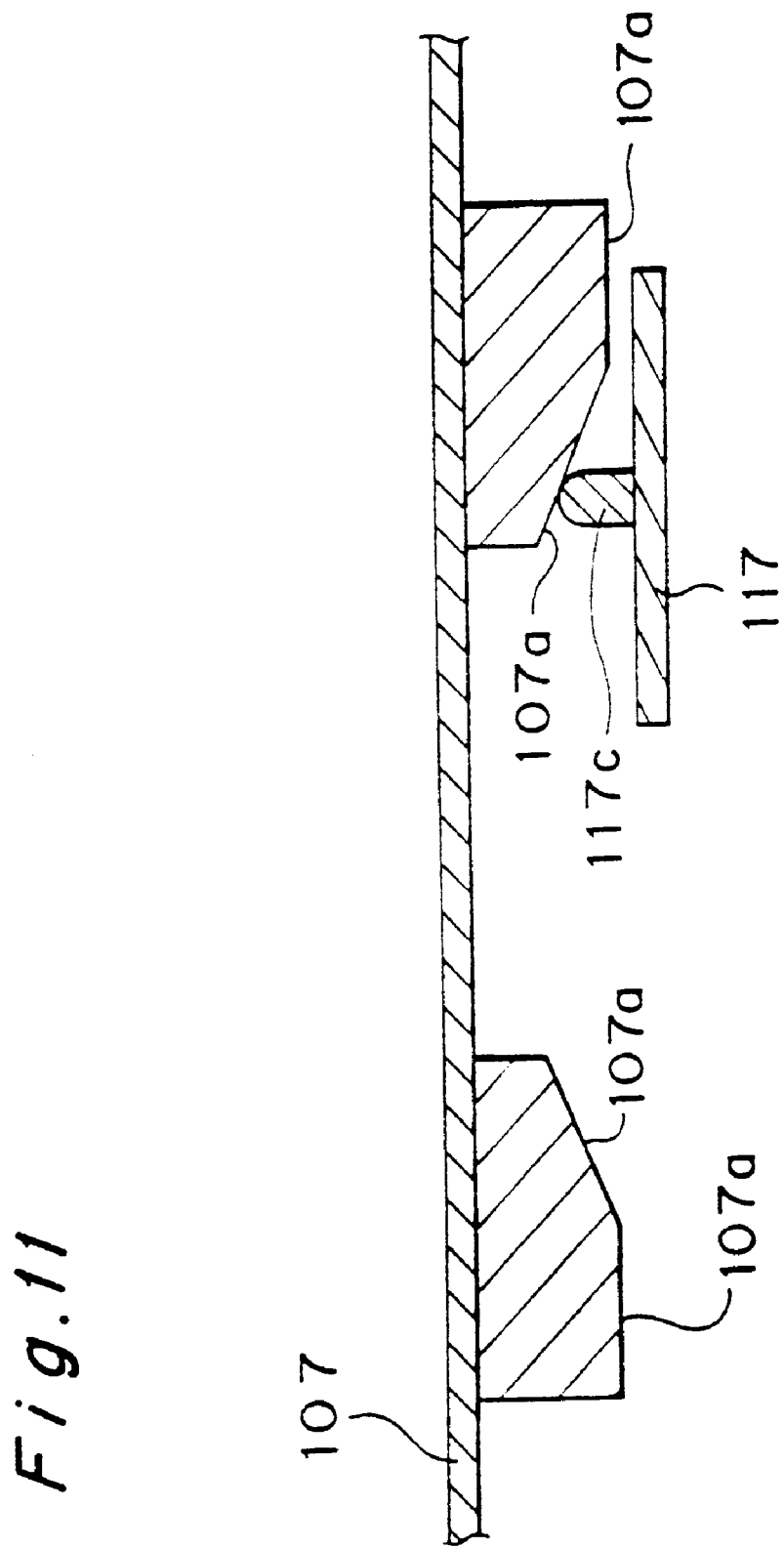
FIG. 11 is an explanatory view showing the construction of a spool lock lever and a cam surface provided on a planetary carrier of the actuating mechanism shown in FIG. 1.
Figure 12:
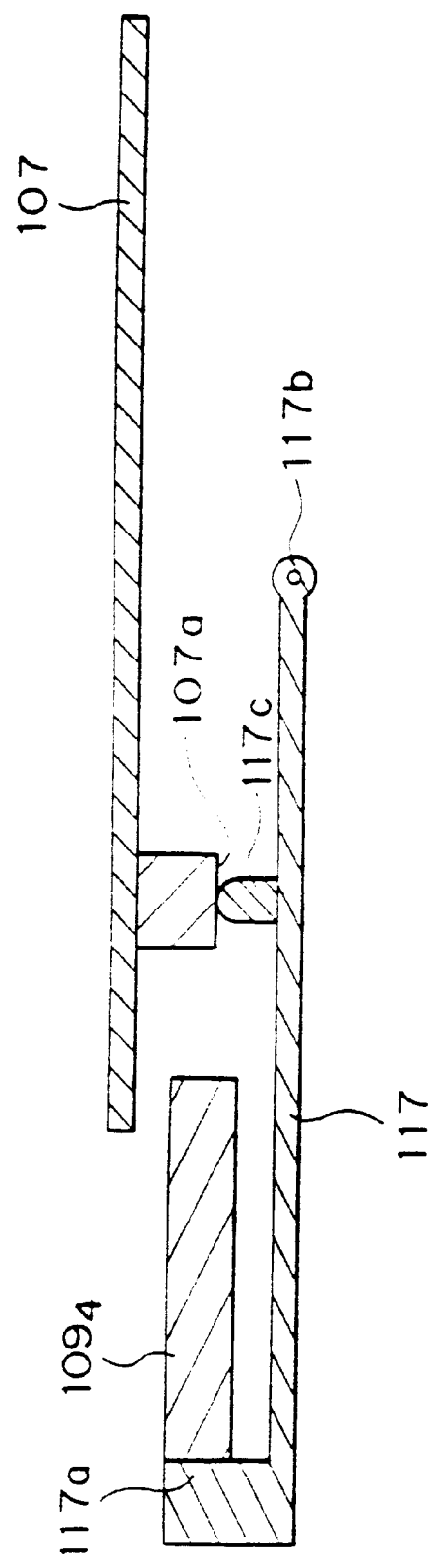
FIG. 12 is an explanatory view showing the relationship between the spool locking lever, the cam surface both of which are shown in FIG. 11, and a station gear.
Figure 13:
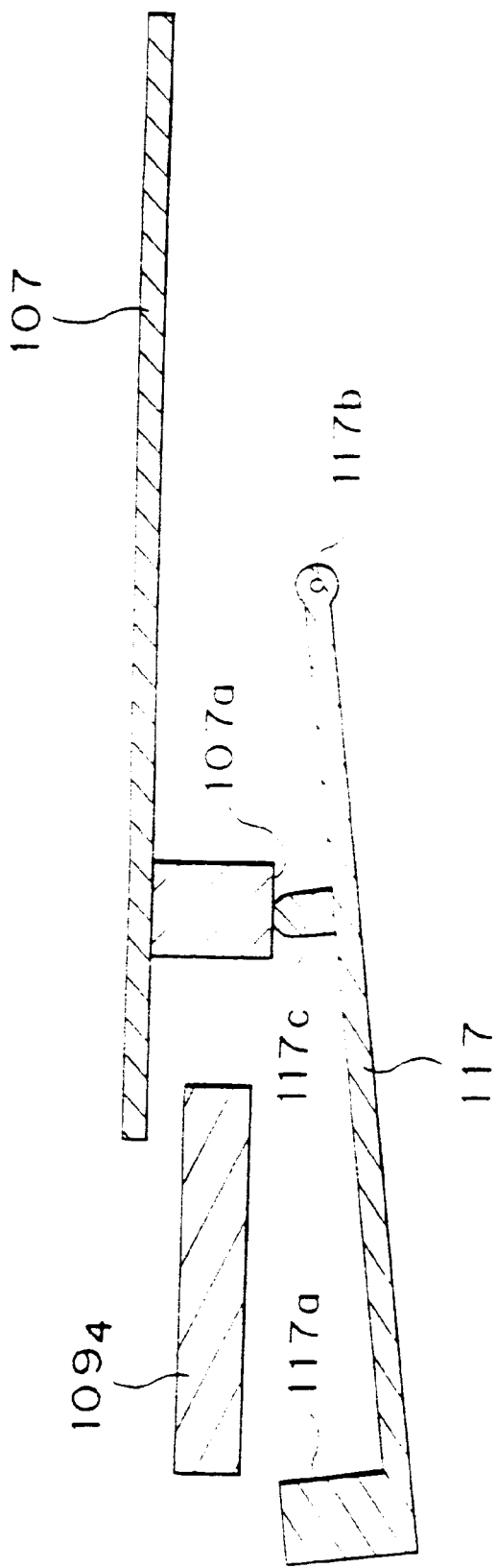
FIG. 13 is an explanatory view similar to FIG. 12.

Referring to FIGS. 11 through 13, the spool locking mechanism comprises the carrier 107, a wedge-shaped cam surface 107a constituted of an inclined surface and a flat lower surface, and a spool locking lever 117 to be pressed downward in engagement with the cam surface 107a and urged by a spring (not shown) so that the spool locking lever 117 moves upward in disengagement from the cam surface 107a. A rack portion 117a formed at an end of the spool locking lever 117 engages the station gear $109_4$ due to the upward movement of the spool locking lever 117, thus preventing the rotation of the station gear $109_4$. The spool locking lever 117 is pivotally mounted on a shaft 117b, perpendicular to the shaft of the spool 101, located at the end thereof opposite the rack portion 117a. A pin 117c which moves on the cam surface 107a projects from the center of the spool locking lever 117. A pair of cam surfaces 107a are provided at locations on the carrier 107 so that the pin 117c faces either of the cam surfaces 107a when the planetary gear 106 engages the station gear $109_1$ or $109_4$. That is, when the planetary gear 106 is in engagement with the station gear $109_1$ or $109_4$, the spool locking lever 117 is pressed downward by the cam surface 107a, and hence the rack portion 117a of the spool locking lever 117 does not engage the station gear $109_4$. When the planetary gear 106 is not in engagement with the station gear $109_1$ or $109_4$, the spool locking lever 117 is not pressed downward by the cam surface 107a, and hence the rack portion 117a of the spool locking lever 117 engages the station gear $109_4$. As a result of the engagement between the rack portion 117a and the station gear $109_4$, the rotation of the station gear $109_4$, and thus the rotation of the spool 101, is prevented. In this manner, the spool 101 is prevented from being rotated by the speed-reduction system 103 accommodated therein when the planetary gear 106 is revolving round the sun gear 105 or in engagement with the station gear $109_3$. Although, in FIG. 10, the pin 117c looks like it is disposed on the flat cam surface 107a, the pin 117c is actually in engagement with the inclined surface thereof. With this state that the rack portion 117 partially engages the station gear $109_4$, the rotation of the station gear $109_4$ is prevented. The rack portion 117a, the shaft 117b, the pin 117c and the cam surface 107a are shown in only FIG. 1, not shown in FIGS. 3 through 10, for simplicity.

Next, the construction of the switching mechanism installed in the driving force transmitting system for switching the rotation of the same station gear to two rotational directions, and its operation are described below.

As regards the mechanism for preventing the planetary gear 106 from rotating round the sun gear 105, the substantially circular carrier 107 is rotatably installed on the output shaft 104 of the speed-reduction system 103 as shown in FIGS. 1 and 2. The planetary gear 106 is frictionally installed on one side of the carrier 107 via the spring 108 in between them. A pair of gear-tooth-shaped locking projections $110_1$ and $110_2$ are formed on the carrier 107 at locations substantially opposite the planetary gear 106. A pair of locking levers $111_1$ and $111_2$ each of which has a leading end portion able to engage the locking projection $110_1$ and $110_2$ and to disengage therefrom are formed at positions facing the locking projections $110_1$ and $110_2$. The base portion of each locking levers $111_1$, $111_2$ is pivotally mounted on the camera body, and the locking levers $111_1$ and $111_2$ are biased by a spring 112 at an intermediate portion therebetween in such a direction as the leading end of each locking lever $111_1$, $111_2$ engages the locking projection $110_1$, $110_2$. The locking lever $111_1$ engages the locking projection $110_1$ or $110_2$, thus preventing the carrier 107 from rotating counterclockwise, namely, the counterclockwise rotation of the planetary gear 106 round the sun gear 105. The locking lever $111_2$ engages the locking projection $110_1$, $110_2$, thus preventing the carrier 107 from rotating clockwise, namely, the clockwise rotation of the planetary gear 106 round the sun gear 105. A cam 113 for allowing the engagement of the locking levers $111_1$, $111_2$ with the locking projection $110_1$, $110_2$ and the disengagement thereof from the locking projection $110_1$, $110_2$ is frictionally installed on an end of the output shaft 104 of the speed-reduction system 103 via a spring 114. The substantially circular cam 113 has a concave formed at a portion of the periphery thereof, thus forming a cam profile. The cam 113 allows one of the locking levers $111_1$, $111_2$ to engage one of the locking projections $110_1$, $110_2$ and allows the other of the locking levers $111_2$, 111, to disengage from the same locking projections $110_2$, $110_1$. Accordingly, when the carrier 107 rotates in one direction, it is prevented from rotating in the other direction by the cam 113. Each cam follower 111a, 111a which moves along the cam profile is integrated with the locking lever $111_1$, $111_2$, respectively. The cam 113 rotates with the output shaft 104, and the amount of its rotation is limited to a predetermined range at which the planetary gear 106 is allowed or is not allowed to rotate round the sun gear 105. As shown in FIG. 1, the cam 113 has a pair of attracted portions 113a and 113b projecting therefrom, while a magnet 115 having attracting portions at both ends is installed therebetween. The rotatable angle of the cam 113 is limited to a predetermined degree so that when the cam 113 rotates in one direction, one of the projections 113a, 113b is brought into contact with one of the attracting portions of the magnet 115; and when the cam 113 rotates in the opposite direction, the other of the projections 113b, 113a is brought into contact with the other of the attracting portions of the magnetic 115. In other words, the magnet 115 acts as the stopper of the cam, thus limiting the rotatable range of the cam 113. The magnet 115 is switched on when switching one station gear to another, the operation of which is described later. Even though the motor 102 keeps rotating with the attracted portion 113a, 113b bumping the attracting portion of the magnet 115, the cam 113 keeps stopping because the cam 113 keeps slipping against the output shaft 104 via the spring 114.

Figure 14:
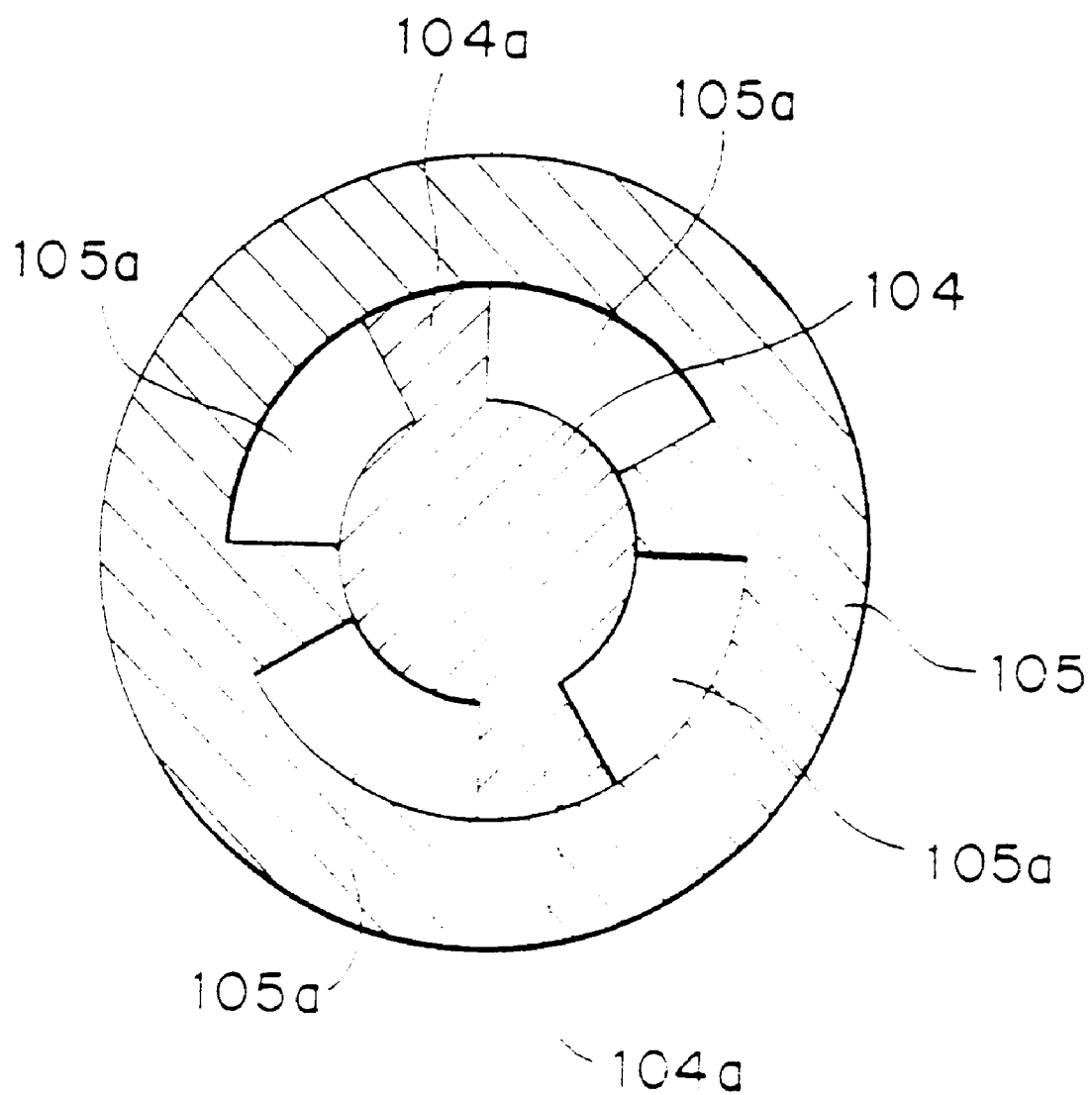
FIG. 14 is a transverse sectional view showing the construction of a "play connection" between an output of a speed reduction system and the sun gear of the actuating mechanism shown in FIG. 1.

The sun gear 105 is installed on the output shaft 104 of the speed-reduction system 103 with a "play" provided. More specifically, as shown in FIG. 14, a pair of projections 104a, 104a formed on the output shaft 104 projects radially outwardly in opposite directions from the output shaft 104. A pair of concaves 105a, 105a for receiving the projections 104a, 104a is formed on the inner peripheral surface of the bearing portion of the sun gear 105. The projections 104a, 104a are slidable circumferentially with respect to the inner surface of the concaves 105a, 105 in a predetermined angular range. Accordingly, even though the output shaft 104 rotates, the rotation of the output shaft 104 is not transmitted to the sun gear 105 until the projections 104a, 104a are brought into contact with the inner wall of the concave 105a, 105a. The slidable range of the projections 104a, 104a corresponds to the range of the "play". That is, when the rotational direction of the motor 102 is switched reverse, the sun gear 105 starts rotating behind time corresponding to the "play".

The operation due to the abovementioned construction is described below. That is, when the rotational direction of the motor 102 is switched reverse in order to reverse the rotational direction of the planetary gear 106 at the same station, the cam 113 starts to rotate instantly together with the output shaft 104 in the same direction. The sun gear 105, however, rests for the predetermined period of time corresponding to the "play", and when the "play" is up, the sun gear 105 starts rotating. In other words, when the motor 102 starts rotating reversely, the sun gear 105 is momentarily stopped. And, during the time when the sun gear 105 stops, only the cam 113 rotates to drive the locking levers $111_1$, $111_2$. The time lag due to the "play" is so slight that a user can not notice. Owing to the "play", the switching of the locking levers $111_1$, $111_2$ is carried out reliably. The switching of the rotational direction of the motor 102 is described below with reference to FIGS. 3 and 5. In the state shown in FIG. 5, the sun gear 105 is rotating counterclockwise, and the planetary gear 106 is rotating clockwise on its axis in engagement with the station gear $109_1$. The force for rotating the planetary gear 106 round the sun gear 105 is checked by the locking lever $111_1$. At this time, the film is being rewound. When the rotational direction of the motor 102 is reversed, the sun gear 105 rests for the predetermined period of time during which the cam 113 rotates clockwise, thus allowing the projection 113a to contact the magnet 115 as shown in FIG. 3 and stopping the rotation of the cam 113. As a result of the rotation of the cam 113, the locking lever $111_1$ disengages from the locking projection $110_2$, whereas the locking lever $111_2$ engages the locking projection $110_2$ as shown in FIG. 3. During the time of switching the locking levers $111_1$, $111_2$, the sun gear 105 rests. Consequently, the planetary gear 106 and the carrier 107 also rest. As a result of further rotation of the motor 102, the sun gear 105 starts to rotate clockwise after the predetermined period of time, corresponding to the "play" passing. The carrier 107 is prevented from rotating clockwise because the locking lever $111_2$ is in engagement with the locking projection $110_2$. Thus, the planetary gear 106 remains at the same position shown in FIG. 5, and it rotates on its axis counterclockwise, accepting the rotation of the motor 102. At this time, the film is wound at a normal speed (see FIG. 3).

As described above, the sun gear 105 is connected to the output shaft 104 with the "play" provided. Therefore, when the rotational direction of the planetary gear 106 is reversed with respect to the same station gear, the cam 113 starts to rotate before the sun gear 105 does. Consequently, switching the locking levers $111_1$, $111_2$ is performed before the carrier 107 starts to rotate. The operation of reversing the rotational direction of the planetary gear 106 relative to the same station gear can be easily done by reversing the rotational direction of the motor 102.

The operation of the abovementioned switching mechanism for switching the station gears is described below.

The magnet 115 functions as a stopper to the cam 113 when the rotational direction of the carrier 107 is reversed. When switching from one station gear to another, the magnet 115 is energized to attract the projection 113a or 113b of the cam 113 thereto and to prevent the rotation of the cam 113.

As a result, the locking levers $111_1$, $111_2$ do not change their positions with respect to the cam 113. Accordingly, when the rotational direction of the motor 102 is reversed in this state, the carrier 107 is permitted to rotate in the direction that the locking projection 110 parts from the locking lever $111_1$, or $111_2$ having stopped the orbital movement of the locking projection 110. In accordance with this motion of the carrier 107, the planetary gear 106 moves from one station gear to another. When the rotational direction of the motor 102 is reversed, the planetary gear 106 starts to rotate round the sun gear 105 behind time corresponding to the "play".

The magnet 115 is deenergized in correspondence with the timing when the planetary gear 106 arrives at the position corresponding to any desired station gear. As a result, the cam 113 starts to rotate, switching the locking levers $111_1$, $111_2$ is performed, and the carrier 107 is locked by the locking lever $111_1$ or $111_2$ so that the planetary gear 106 is stopped at a desired station gear. A code indicating the rotational position of the carrier 107 is provided thereon. A photoreflector 116 is positioned to face the code so as to read it. This positional detection mechanism comprising the code and the photoreflector 116 allows the location of the planetary gear 106 to be always monitored.

For example, in case that the planetary gear 106 changes its position from the state, in which the film is being rewound, shown in FIG. 5 to the state, in which the driving force from the motor 102 is transmitted to the station gear $109_3$, shown in FIG. 7 via the state shown in FIG. 8, the magnet 115 is energized, thus attracting the projection 113b thereto. Accordingly, the locking levers $111_1$ and $111_2$ keep their state shown in FIG. 5. When the rotational direction of the motor 102 is reversed with the positional state shown in FIG. 5 being kept, the sun gear 105 starts to rotate clockwise behind time corresponding to the "play", and the planetary gear 106 starts rotating round the sun gear 105 in the direction that the planetary gear 106 disengages and parts from the station gears $109_1$ and $109_2$ (see FIG. 8). When the magnet 115 is deenergized just before the arrival of the planetary gear 106 at a position corresponding to the station gear $109_3$, the cam 113 is free to move. As a result, the rotation of the output shaft 104 is transmitted to the cam 113 via the friction spring 114, and the attracted portion 113b of the cam 113 starts parting from the magnet 115, as shown in FIGS. 8 and 7. In accordance with the rotation of the carrier 107, the locking projection $110_1$ formed on the carrier 107 moves in between the locking lever $111_1$ and $111_2$, the locking lever $111_1$ is pressed radially outwardly by the cam 113, and the locking projection 110 is stopped by the locking lever $111_2$ with the locking lever $111_2$ being moved radially inwardly as shown in FIG. 7. This position corresponds to the position where the planetary gear 106 engages the station gear $109_3$ and the driving force from the motor 102 is transmitted thereto. As described previously, the spool locking lever 117 keeps preventing the rotation of the station gear $109_4$, and therefore the rotation of the spool 101, after the planetary gear 106 parts from the station gears $109_1$ and $109_2$.

As described above, according to the first embodiment of the present invention, the planetary gear 106 can be rotated round the sun gear 105 in both clockwise and counterclockwise direction to switch the driving force transmitting system, and the planetary gear 106 can also be rotated on its axis in both direction so that the rotations in both directions from the motor 102 can be transmitted to any one of the station gears $109_1$–$109_4$. In particular, the magnet can be constructed smaller than conventional plungers and constructed more inexpensively. A small force suffices for disengaging the locking lever from the locking projection, because the locking projection to disengage never fails to part from the locking lever, thus making the force to drive the cam considerably smaller. That is, a greater force is not required to overcome the frictional force exerting between the locking lever and the locking portion according to the conventional art. By using the magnets, it is possible to make the actuating mechanism smaller and compact.

In this first embodiment, the photoreflector 116 is located at a position facing the carrier 107, but in order to accomplish more accurate control, it is effective to dispose a means such as a photoreflector or a photointerrupter for detecting the rotational amount of the motor 102 between the output shaft of the motor 102 and the output shaft 104 of the speed-reduction system 103.

Providing a means for detecting the rotational position of the cam 113 makes it possible to carry out the following control. That is, for example, in case that the planetary gear 106 changes its position from one state that the planetary gear 106 engages one station gear $109_3$ to another state that the planetary gear 106 engages another station gear, the planetary gear 106 has two directions to rotate around the sun gear 105. Here, one of the attracted portions 113a, 113b of the cam 113 contacts the magnet 115 in accordance with a rotational direction of the motor 102; therefore, the planetary gear 106 can be allowed to rotate only in one direction in order to switch from one station gear to another with the attracted portion of the cam 113 being attracted to the magnet 115.

On the other hand, if one wants to reverse the rotational direction of the planetary gear 106 around the sun gear 105, switching from one station gear to another can be performed after reversing the control direction by the locking levers $111_1$ and $111_2$. In this case, if the rotational direction of the motor 102 is reversed a bit, and if the rotated amount thereof is detected from the position of the cam 113, it is possible to freely select the attracted portion 113a, 113b to be attracted by the magnet 115. In this construction, it is free to choose the direction of rotation of the planetary gear around the sun gear in order to switch from one station gear to another.

In the first embodiment, the projections 113a and 113b are formed parallel with respect to each end surface of the magnet 115 at the position where the projection 113a or 113b contacts the magnet 115. If the attracted portions 113a, 113b of the cam 113 are constructed as separate members free to move to some extent, each attracted portion 113a, 113b can be attracted to the magnet 115 in closer contact therebetween.

Figure 15:
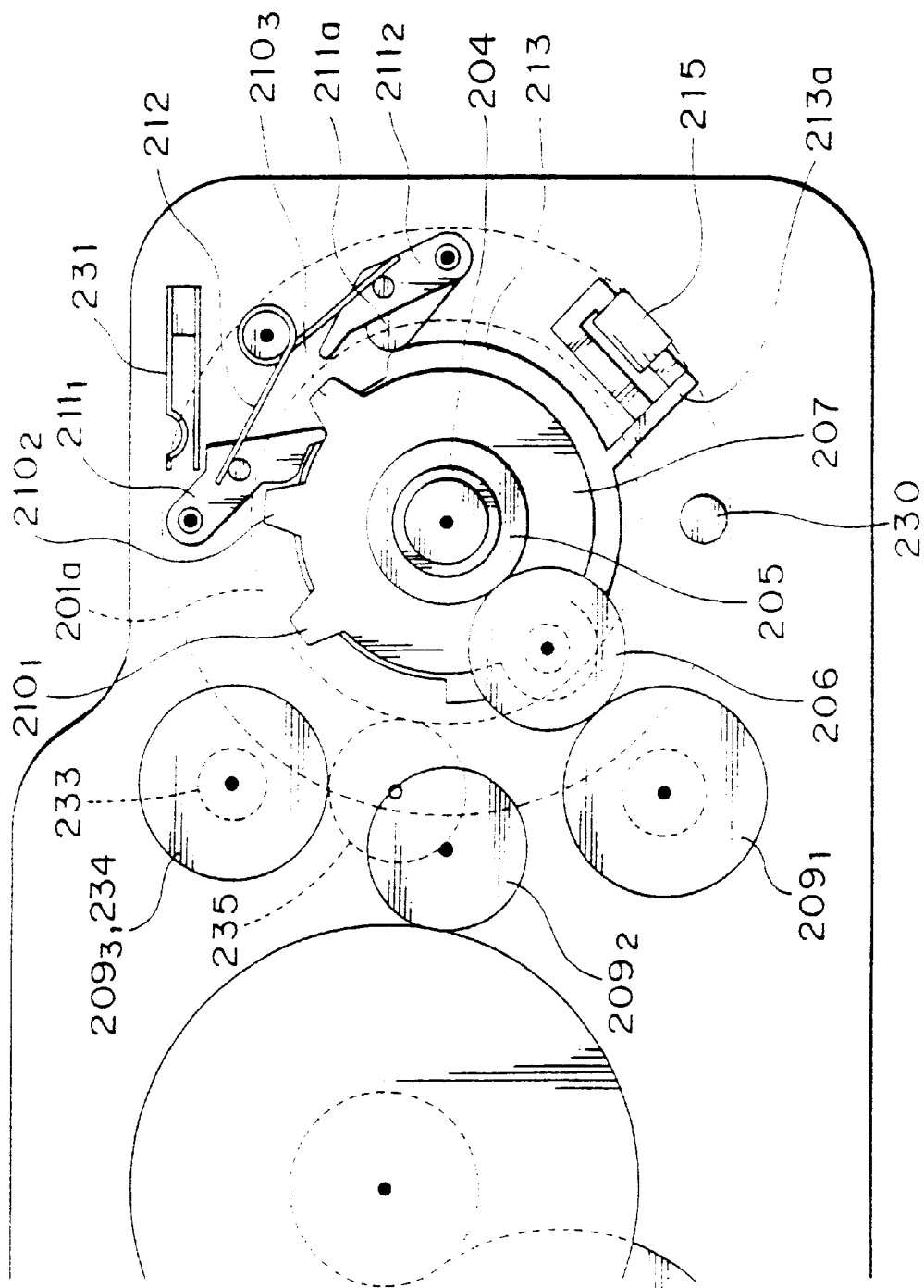
FIG. 15 is an explanatory bottom view showing an actuating mechanism according to a second embodiment of the present invention.

An actuating mechanism according to a second embodiment is described below with reference to FIGS. 15 through 25. Similarly to the first embodiment, stations can be switched from one to the other and the rotational direction of a planetary gear can be reversed with the mechanism comprising the output shaft of a reduction system connected to a sun gear with a "play" provided therebetween, a carrier having locking projections, locking levers driven by a cam and preventing the rotation of the carrier, namely, the rotation of the planetary gear around the sun gear, and a magnet serving as the stopper of the cam and performing attracting operation. Here, the mechanisms of the second embodiment having the same construction and operation as those of the first embodiment are not described. Unlike the first embodiment in which the magnet 115 having attracting portions at both ends thereof is used to allow the planetary gear 106 to rotate round the sun gear 105 clockwise and counterclockwise in switching the stations from one to the other, a magnet 215 according to the second embodiment has an attracting portion at one end thereof. Accordingly, the position of a projection 213a of a cam 213 is determined by being attracted to the magnet 215 in switching stations from one to the other. That is, the postures of locking levers $211_1$ and $211_2$ are kept constant when the projection 213a is attracted to the magnet 215, and thus the carrier 207 is rotatable in only one direction. Accordingly, the planetary gear 206 is allowed to rotate only clockwise in switching the stations from one to the other as shown in FIG. 15. The cam 213 is allowed to rotate in the range in which the projection 213a is rotatable between the magnet 215 and a stopper pin 230. The locking lever $211_2$ is pivoted by the cam 213, whereas the locking lever $211_1$ functions as a ratchet claw permitting the carrier 207 to rotate clockwise and preventing the carrier 207 from rotating counterclockwise. The locking lever $211_1$ acts an actuator for turning on a switch 231 each time the locking lever $211_1$ is pressed radially outwardly by a locking projection $210_{1-3}$ of the carrier 207. The switch 231 outputs signals each time the switch 231 is turned on, thus counting the number of stations through which the planetary gear 206 has passed.

A station gear $209_1$ is an input gear for transmitting the driving force from a motor 202 to a system for driving a photographic lens barrel 222 in zooming operation. A station gear $209_2$ is an input gear for transmitting the driving force from a motor 202 to a film-rewinding system. A station gear $209_3$ is an input gear for transmitting the driving force from a motor 202 to a film-winding system.

Figure 17:
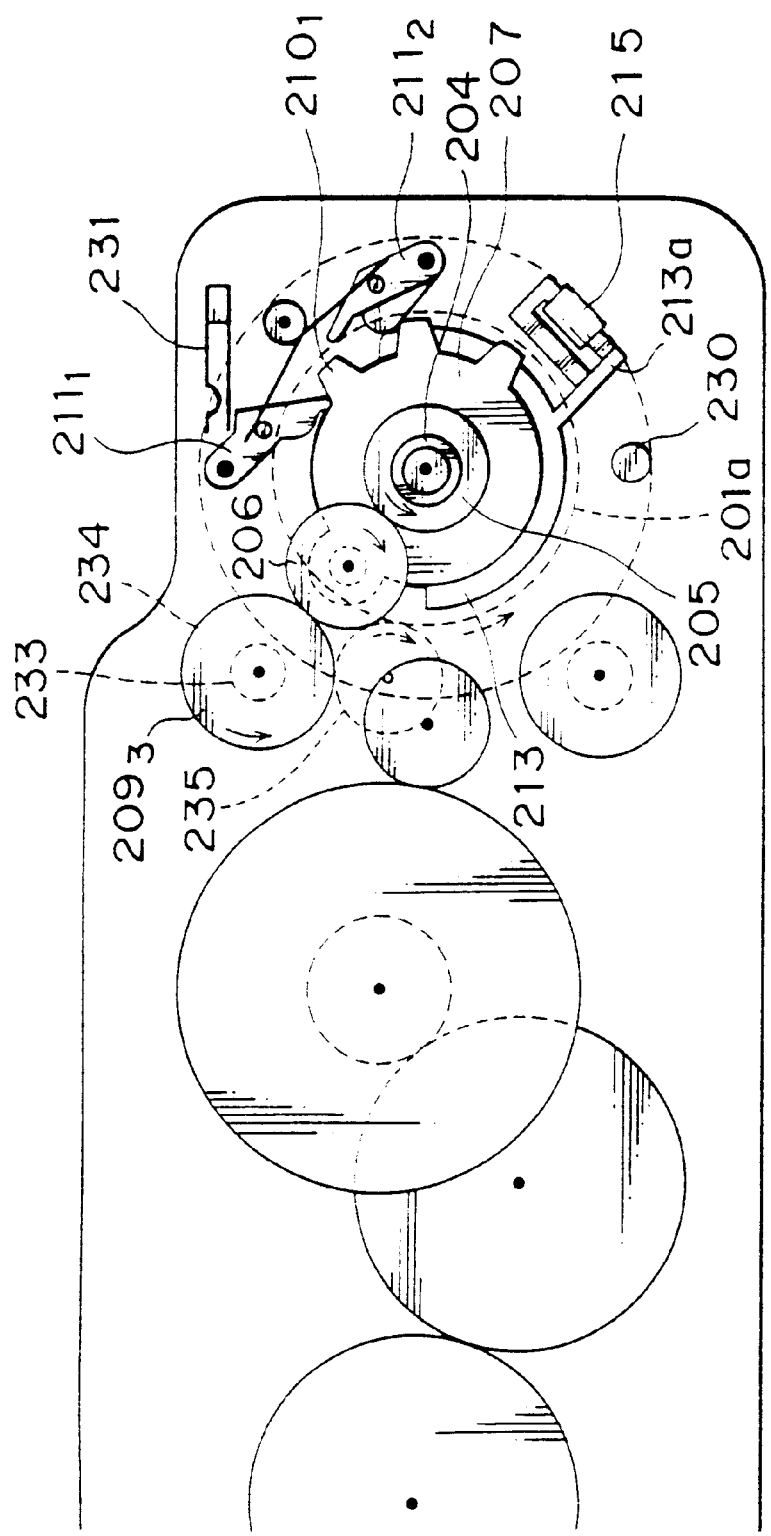
FIG. 17 is an explanatory bottom view of the actuating mechanism shown in FIG. 15 in which a film is being wound.
Figure 32:
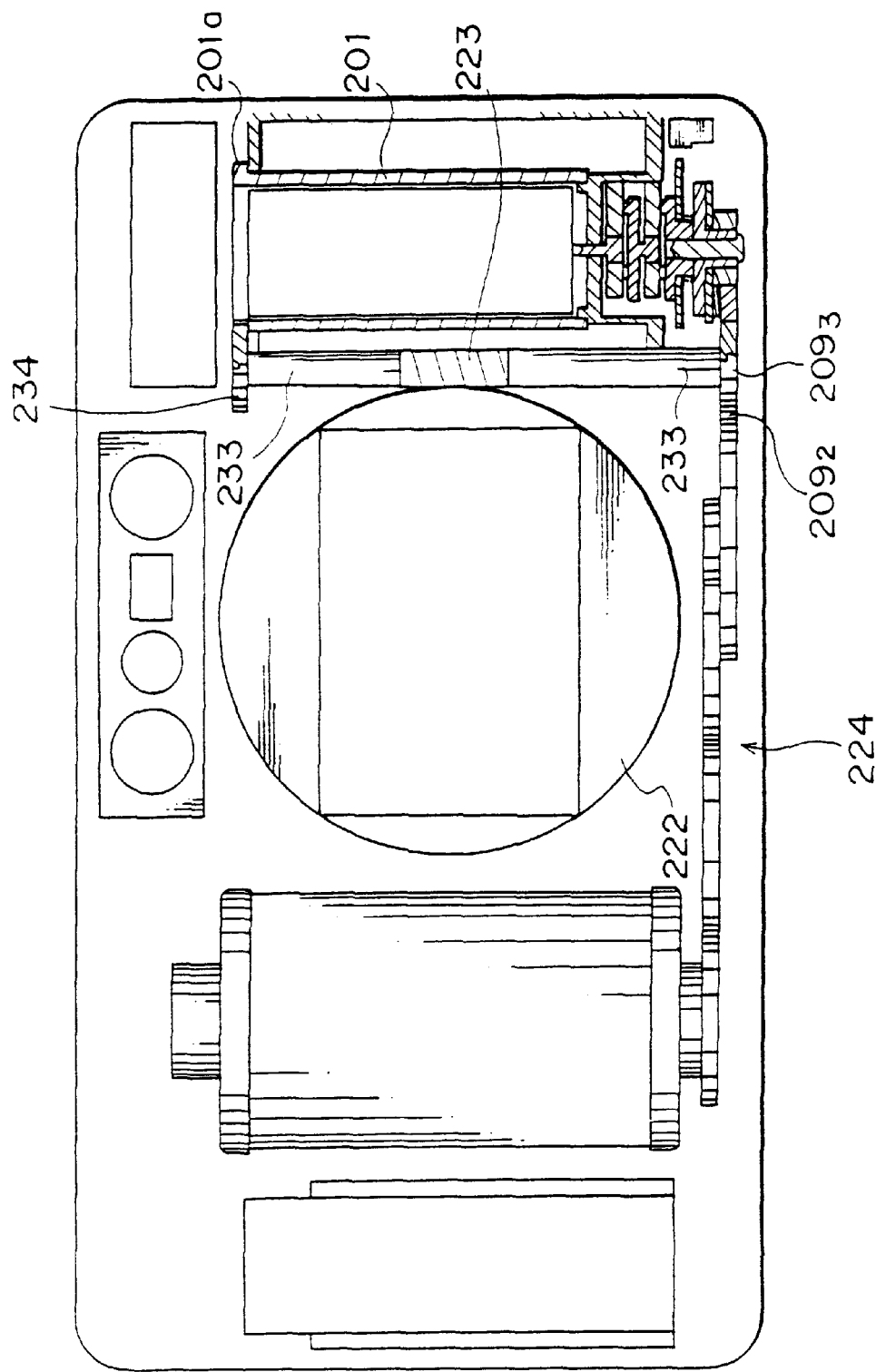
FIG. 32 is a front view showing the relationship between the actuating mechanism of FIG. 15 and a camera.
Figure 36:
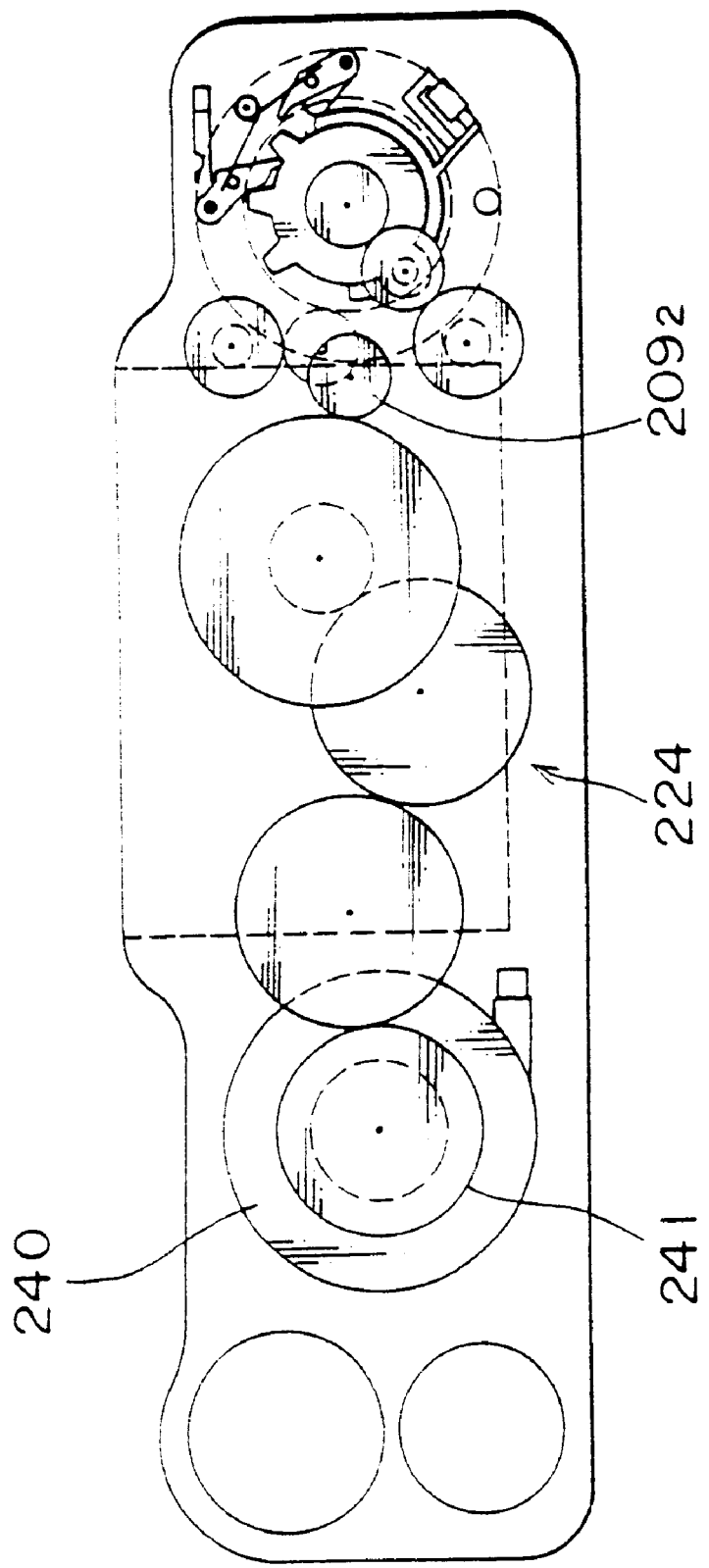
FIG. 36 is a bottom view showing the relationship between the actuating mechanism of FIG. 15 and the camera.

In the second embodiment, as shown in FIG. 32, a spool gear 201a is formed on the peripheral surface of the upper end of the spool 201. A spool-driving gear 235 engages a gear 234 formed on the upper end of a shaft 233 extending vertically upward from the station gear $209_3$ and having a configuration similar to the station gear $209_3$. The spool-driving gear 235 engages the spool gear 201a. In winding the film, the state of the actuating mechanism is as shown in FIG. 17. Referring to FIG. 17, the sun gear 205 rotates counterclockwise while the planetary gear 206 does not rotate round the sun gear 205 but rotates on its axis in engagement with the station gear $209_3$, thus transmitting the driving force from the motor 202 to the station gear $209_3$ because the rotation of the carrier 207 is prevented by the locking lever $211_1$. The lens barrel 222 is driven by a worm gear 223 provided on the shaft 233. As shown in FIG. 36, a gear train of the film-rewinding system extends from the station gear $209_2$ along the bottom surface of the camera body. Referring to FIG. 36, reference numeral 240 shows a film cartridge and 241 shows a gear, connected with a fork (not shown), for driving the spool of the film cartridge 240.

Figure 16:
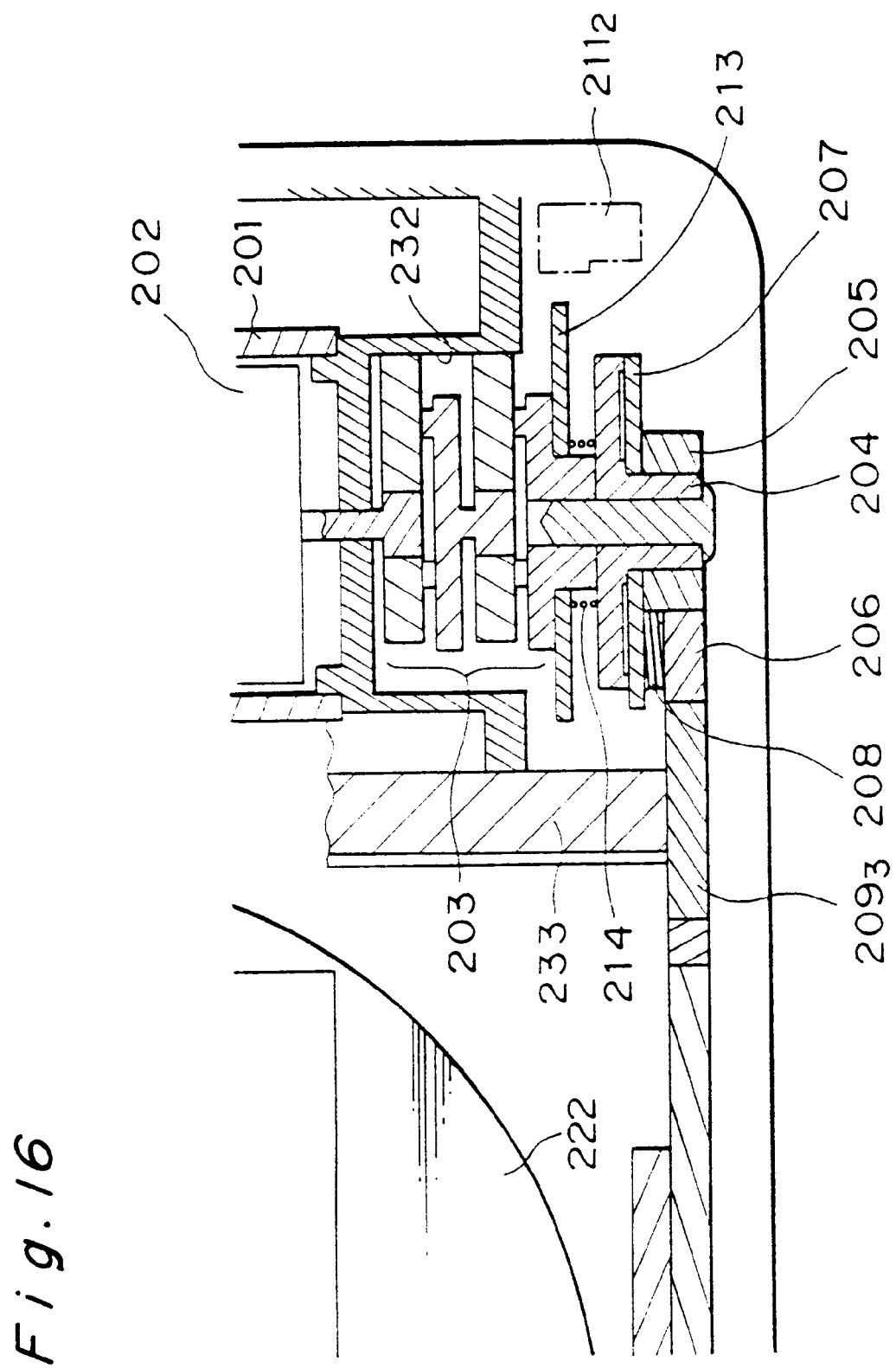
FIG. 16 is a vertical sectional view of the actuating mechanism shown in FIG. 15.

A peripheral ring gear 232 of a speed-reduction system 203 comprising a gear train is a fixed ring gear formed at an end of the camera body. As shown in FIG. 16, the diameter of the fixed ring gear 232 is a little bit smaller than the outer diameter of the spool 201. Accordingly, the film wound round the spool 201 extends downward from the lower end of the spool 201. This construction reduces the length of the speed-reduction system 203, projecting downward from the spool chamber, thus allowing the camera body to be compact.

The operation of reversing the driving rotational direction of the planetary gear 206 at the same station is performed similarly to the first embodiment.

Figure 18:
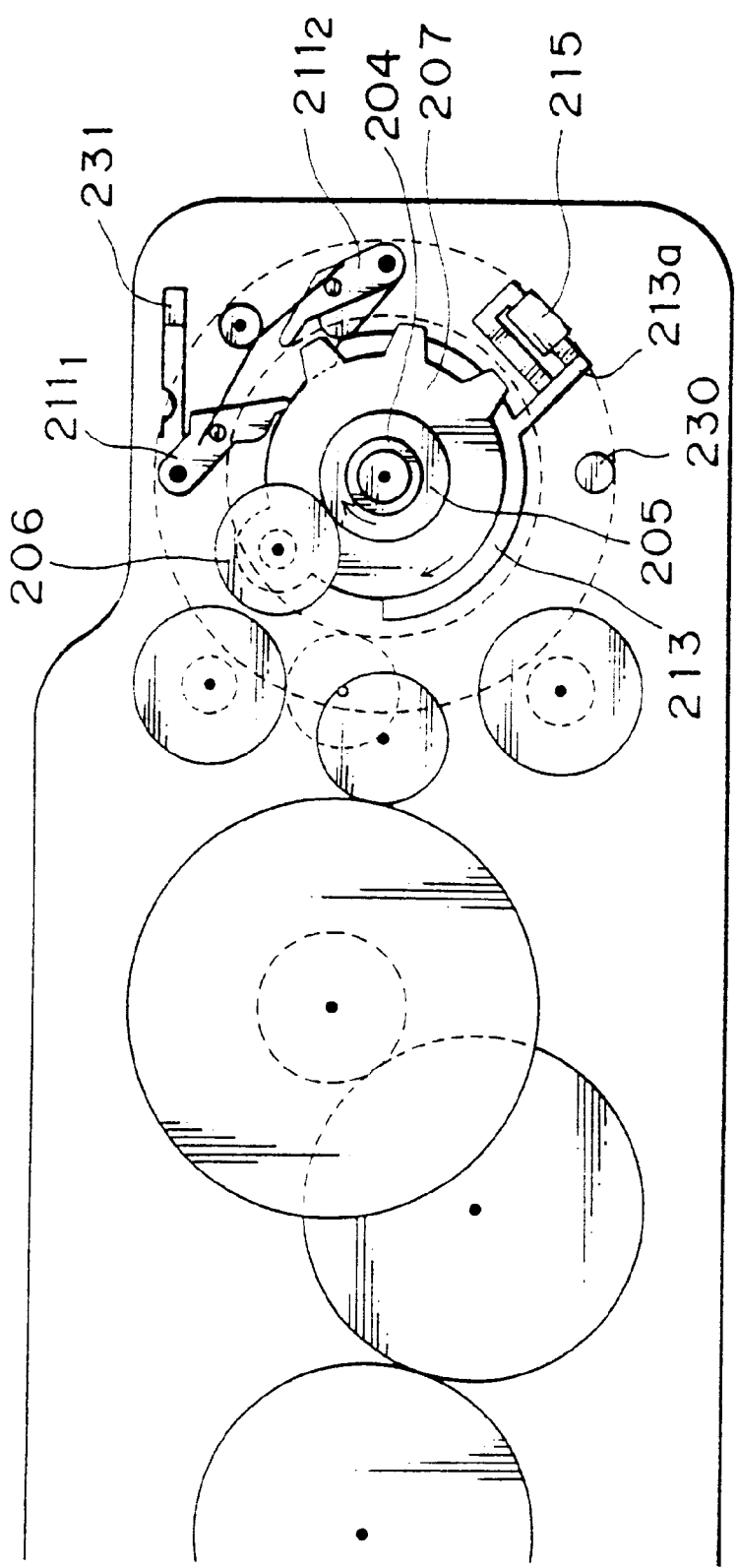
FIG. 18 is an explanatory bottom view of the actuating mechanism shown in FIG. 15 in which a planetary gear is rotating clockwise to switch the station.

In switching film-winding operation to zooming operation, the rotational direction of the motor 202 is reversed and the magnet 215 is energized as shown in FIG. 17 so that the magnet 215 attracts the projection 213a of the cam 213 thereto. As a result, as shown in FIG. 18, the locking levers $211_1$ and $211_2$ allow the carrier 207 to rotate clockwise. That is, the planetary gear 206 disengages from the station gear $209_3$ and rotates counterclockwise round the sun gear 205, thus approaching to a position immediately before the station gear $209_1$. At this time, the locking projection $210_3$ pushes the locking lever $211_1$ radially outwardly and the switch 231 is turned on, thus outputting a signal and the magnet deenergized. Consequently, the projection 213a is released from the magnet 215, the cam 213 rotates together with the carrier 207, and the projection 213a is moved into contact with the stopper pin 230 with the locking lever $211_2$ engaging the locking projection $210_3$. As a result, the rotation of the carrier 207 is stopped and the rotation of the planetary gear 206 around the sun gear 205 is stopped (see FIG. 19). When the motor 202 keeps rotating with the sun gear 205 rotating clockwise, the planetary gear 206 (see FIG. 19) rotates counterclockwise on its axis, thus transmitting the driving force from the motor 202 to the station gear $209_1$. At this time, the zooming operation is switched from the telescopic side to the wide side. When the rotational direction of the motor 202 is reversed, the cam 213 rotates counterclockwise while the sun gear 205 and the planetary gear 206 rest for a predetermined period of time corresponding to the "play", thus moving the projection 213a into contact with the magnet 215 (see FIG. 20). At this time, the locking lever $211_2$ disengages from the projection $210_3$ while the locking lever $211_1$ prevents the carrier 207 from rotating counterclockwise. Therefore, the planetary gear 206 starts to rotate clockwise on its axis, thus transmitting the driving force from the motor 202 to the station gear $209_1$. At this time, the zooming operation is switched from the wide side to the telescopic side. Similarly to the first embodiment, backlash is removed in the zooming operation in the second embodiment. When the zooming operation is completed, the actuating mechanism is set in the state, as shown in FIG. 20, for preparing the switch-over to the station gear $209_3$.

Figure 19:
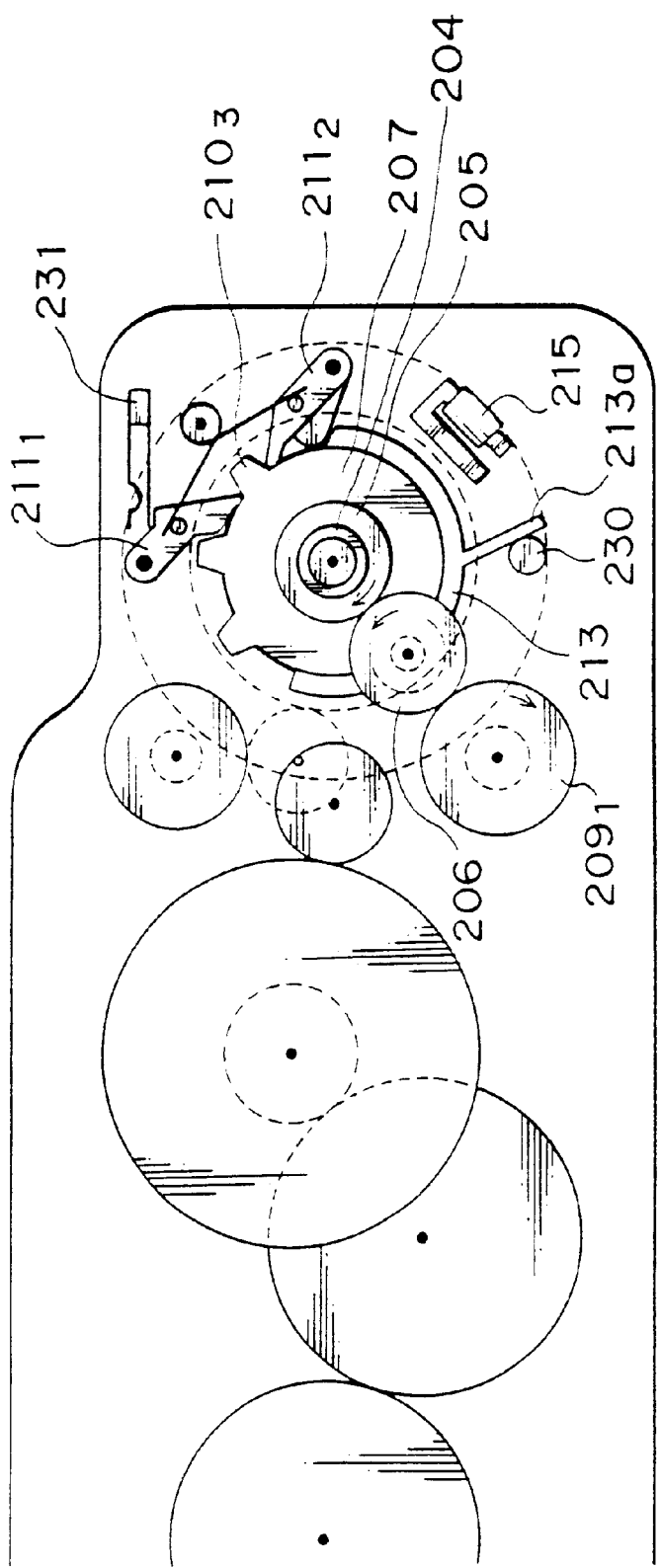
FIG. 19 is an explanatory bottom view of the actuating mechanism shown in FIG. 15 in which zooming operation is performed.
Figure 20:
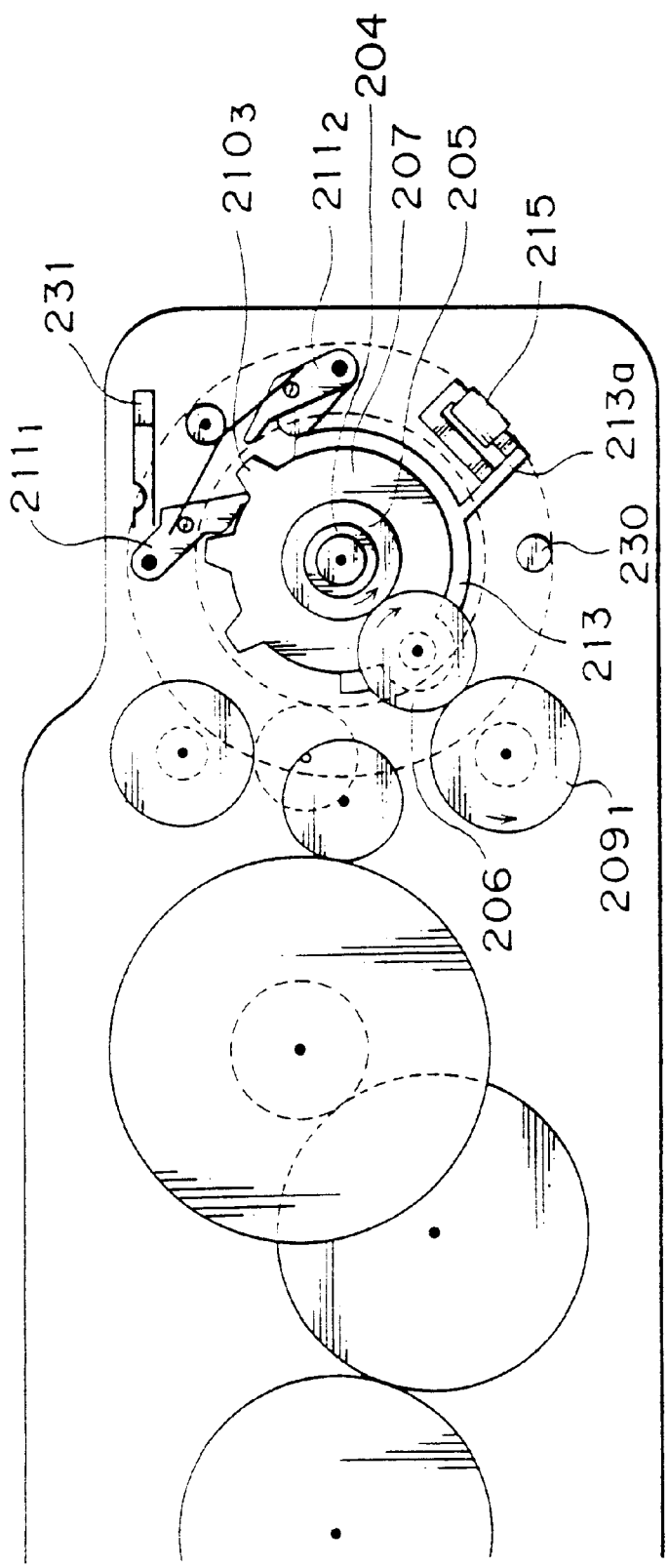
FIG. 20 is an explanatory bottom view of the actuating mechanism shown in FIG. 15 in which zooming operation is performed.

FIG. 19 or 20 shows the state immediately before the zooming operation is switched to the film-winding operation. When the state of the zooming operation is as shown in FIG. 19, the rotational direction of the motor 202 is reversed to obtain the state shown in FIG. 20 before the switching operation is started. When the magnet 215 is energized with the state shown in FIG. 20, the projection 213a is attracted to the magnet 215 and hence, the cam 213 is held at the position shown in FIG. 20. When the rotational direction of the motor 202 is switched from the counterclockwise direction to the clockwise direction, the carrier 207 starts to rotate and thus the planetary gear 206 starts to rotate clockwise round the sun gear 205 (see FIG. 18). When the planetary gear 206 continues to rotate clockwise round the sun gear 205, the locking lever $211_1$ passes over the locking projections $210_2$ and $210_1$ sequentially (from state shown in FIG. 20 to state shown in FIG. 24 via state shown in FIGS. 23 and 22). During this period of time, the switch 231 is turned on twice. When the switch 231 outputs a second signal, the magnet 215 is deenergized. As a result, the projection 213a is released from the magnet 215 and thus the cam 213 rotates together with the carrier 207, and the projection 213a is brought into contact with the stopper pin 230. Consequently, the locking lever $211_2$ engages the locking projection $210_1$. Thereafter, the carrier 207 stops rotation, and thus the planetary gear 206 stops rotating round the sun gear 205, thus engaging the station gear $209_3$. When the rotational direction of the motor 202 is reversed, the cam 213 rotates counterclockwise while the sun gear 205 and the planetary gear 206 rest for the period of time corresponding to the "play", and the projection 213a is brought into contact with the magnet 215. When the motor 202 continues to rotate further, the film-winding operation is performed in the state shown in FIG. 17.

Figure 23:
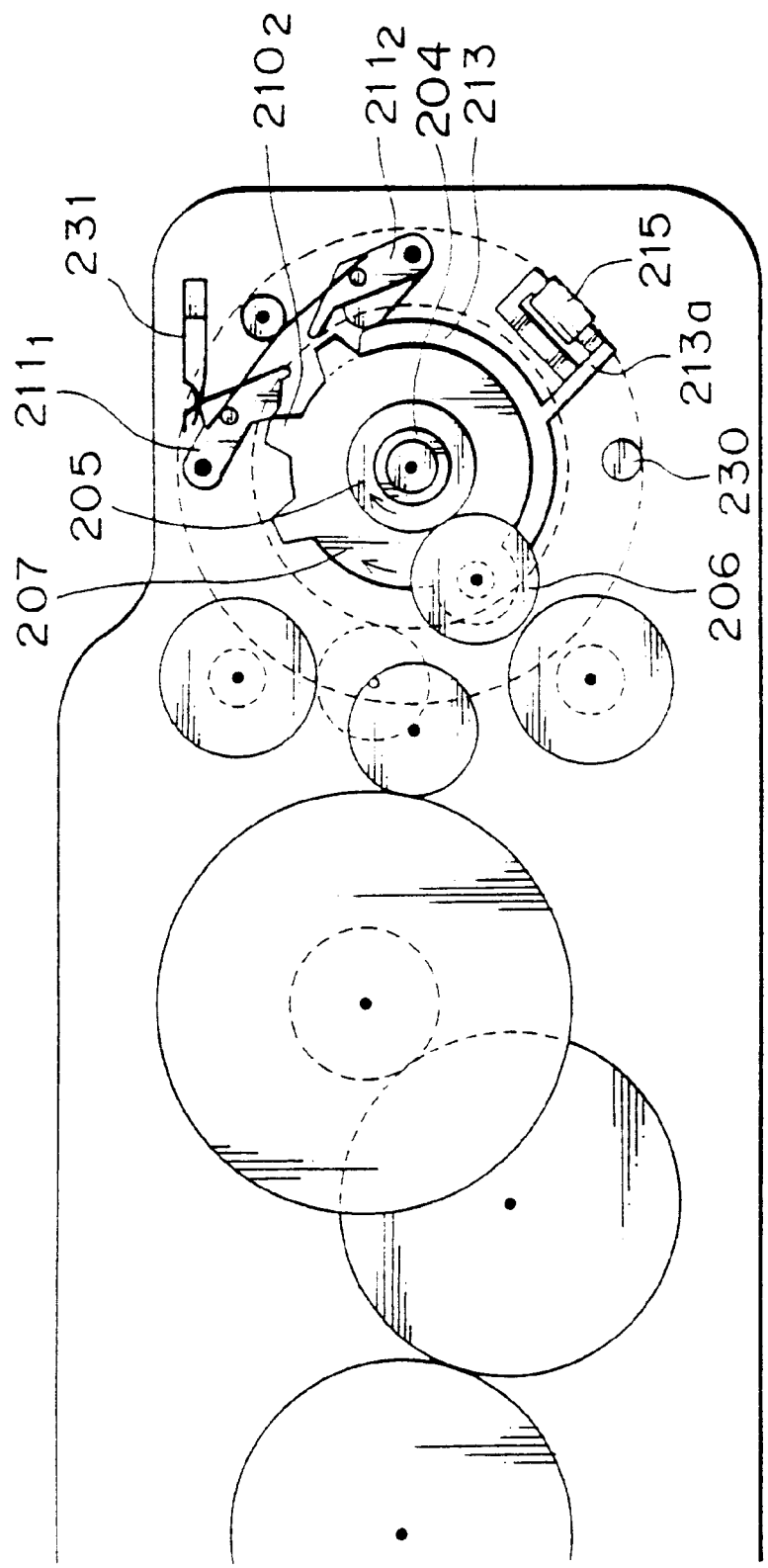
FIG. 23 is an explanatory bottom view of the actuating mechanism shown in FIG. 15 in which a switch is turned on when the planetary gear passes a station gear.

When the roll of film is completely taken up around the spool 201, the film is forcibly stopped. Then, the state of the actuating mechanism shown in FIG. 17 changes to the state thereof shown in FIG. 21 via the states shown in FIGS. 18 and 23. When the planetary gear 206 approaches to a position immediately before the station gear $209_1$, the locking projection $210_3$ presses the locking lever $211_1$ radially outwardly, thus turning on the switch 231. When the planetary gear 206 approaches to a position immediately before the station gear $209_2$, the switch 231 is turned on again, thus outputting a second signal due to the operation of the locking projection $210_2$ as shown in FIG. 23. When the switch 231 outputs the second signal, the magnet 215 is deenergized. As a result, the projection 213a is released from the magnet 215 and thus the cam 213 rotates together with the carrier 207, and the projection 213a is brought into contact with the stopper pin 230. Consequently, the locking lever $211_2$ engages the locking projection $210_1$. Thereafter, the carrier 207 stops rotation, and the planetary gear 206 stops rotating round the sun gear 205 (see FIG. 21). When the motor 202 continues to rotate further with the sun gear 205 rotating clockwise, the planetary gear 206 rotates counterclockwise on its axis with the state shown in FIG. 21 maintained, thus transmitting the driving force of the motor 202 to the station gear $209_2$. At this time, the film is rewound.

Figure 21:
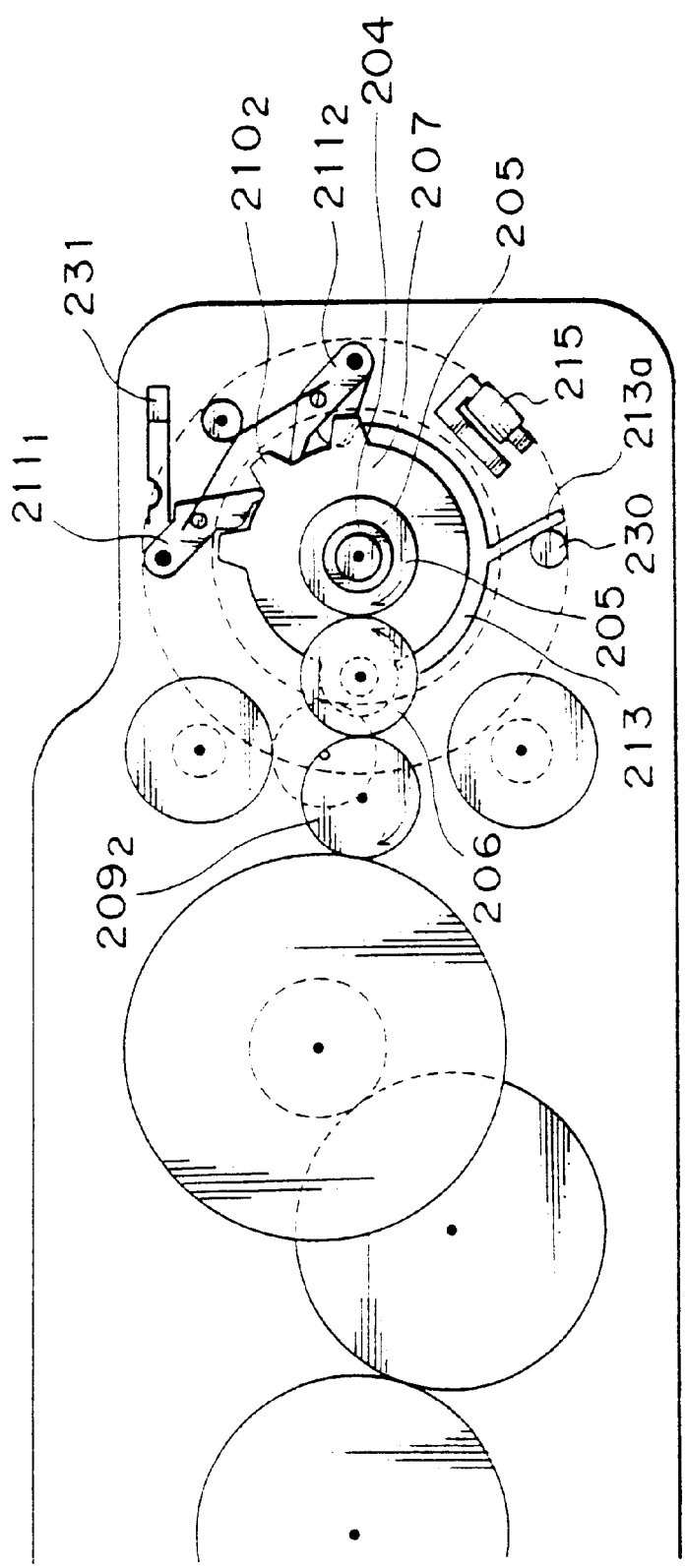
FIG. 21 is an explanatory bottom view of the actuating mechanism shown in FIG. 15 in which the film is being rewound.
Figure 22:
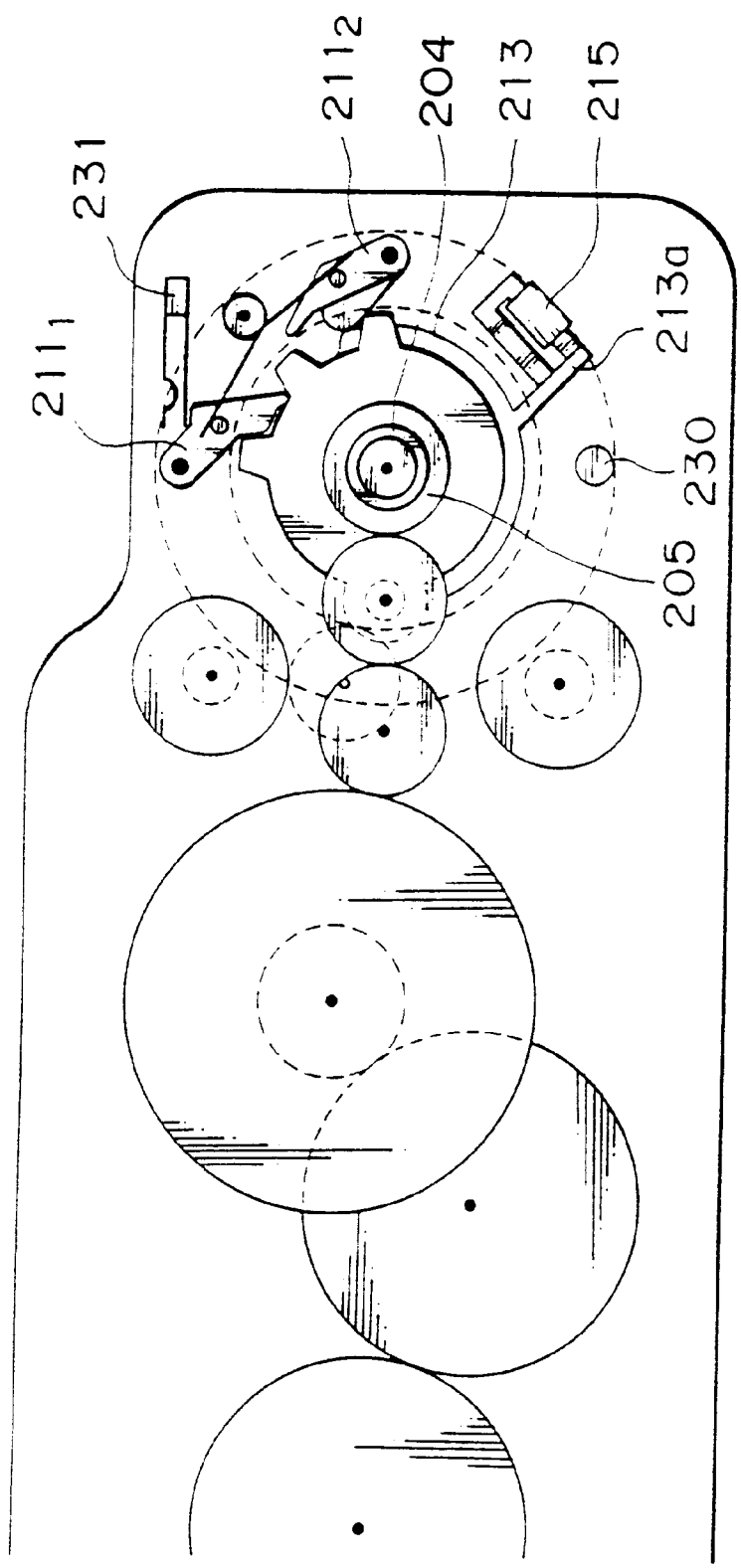
FIG. 22 is an explanatory bottom view of the actuating mechanism shown in FIG. 15 in which the rotational direction of a motor is reversed and a magnet is energized in order to switch the station.
Figure 24:
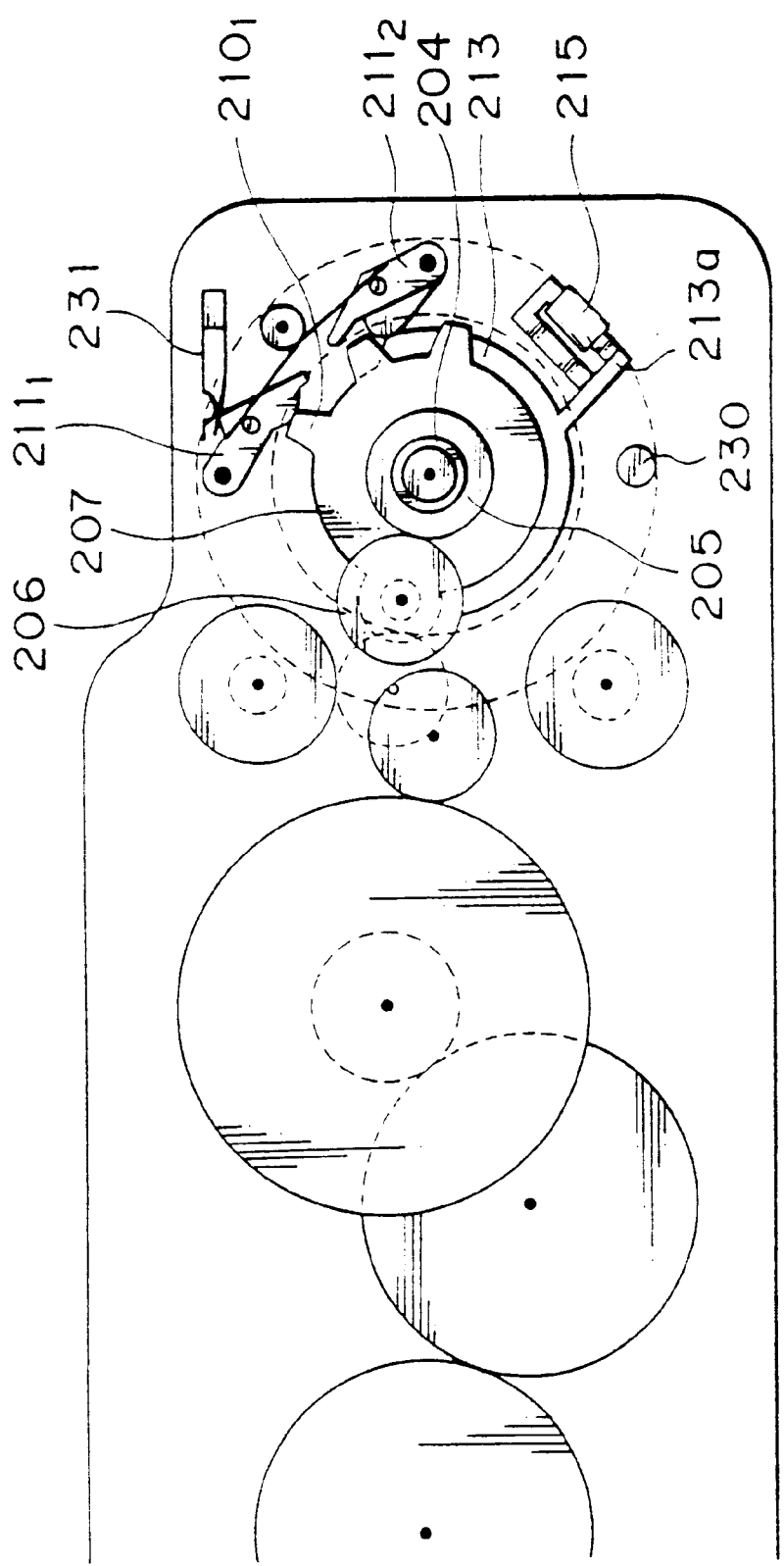
FIG. 24 is an explanatory bottom view similar to FIG. 23.
Figure 25:
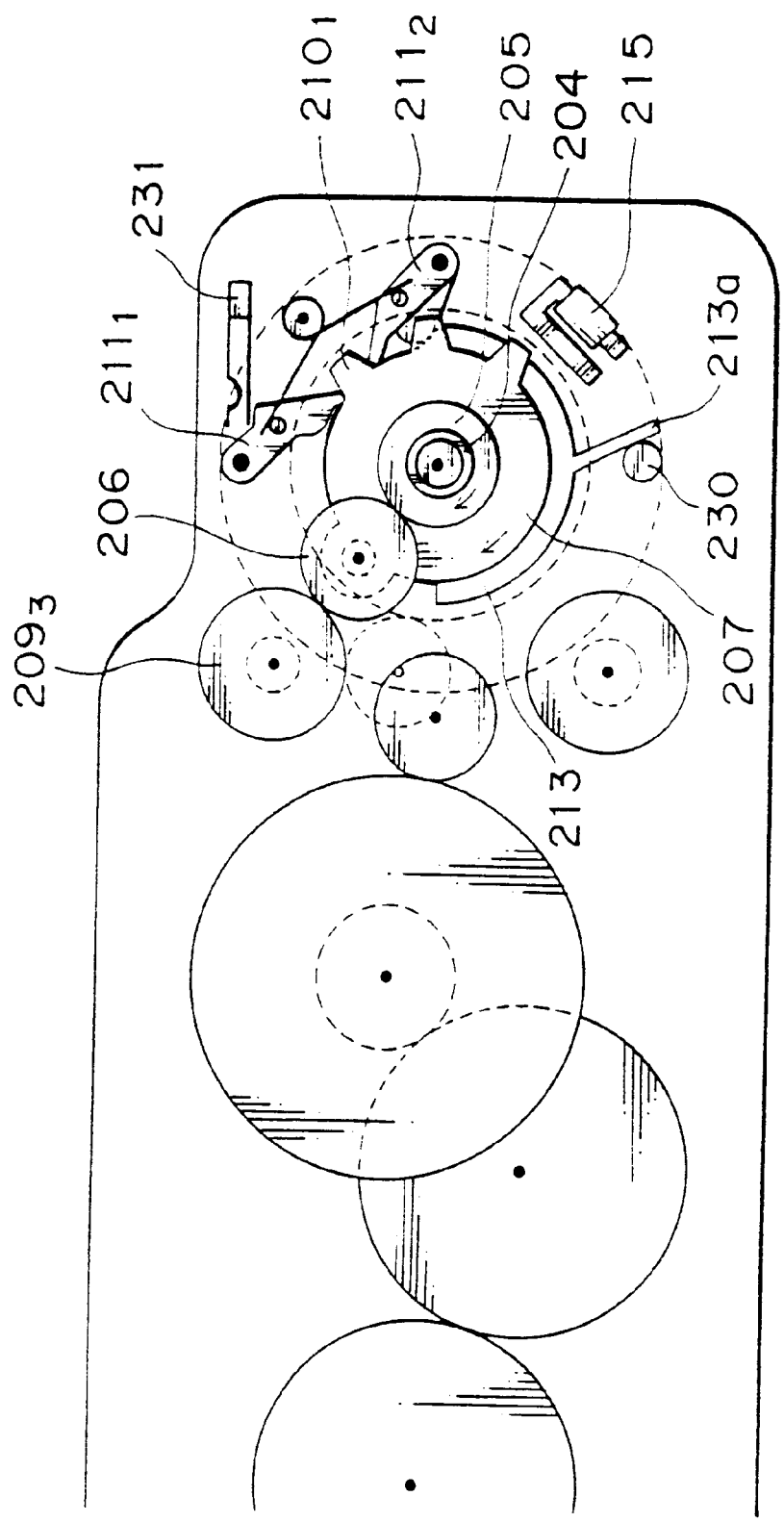
FIG. 25 is an explanatory bottom view of the actuating mechanism of FIG. 15 which shows the state thereof immediately after the actuating mechanism is shifted to the state shown in FIG. 17.

FIGS. 22 through 25 show a transitional state of the actuating mechanism at each time when the station gear is switched from one to the other. FIG. 22 shows a switch-over preparation state with the magnet 215 energized through which the state of the actuating mechanism shown in FIG. 21 is switched to the state thereof shown in FIG. 17 or FIG. 19. FIG. 23 shows a state of the actuating mechanism in which when the planetary gear 206 passes the station gear $209_1$, the switch 231 is turned on due to the operation of the locking lever $211_1$. FIG. 24 shows a state thereof in which when the planetary gear 206 passes the station gear $209_2$, the switch 231 is turned on due to the operation of the locking lever $211_1$. FIG. 25 shows another state thereof subsequent to the state shown in FIG. 17.

Similarly to the first embodiment, in the second embodiment, it is possible to provide a position-detecting mechanism for detecting the rotational position of the carrier 207 or a detecting mechanism for detecting the rotational amount of the motor 202. It is possible to provide a means for detecting the rotational position of the cam 213 so as to control the timing when the projection 213a is attracted to the magnet 215 in switching the station gear from one to the other. It is also possible to provide a pivotal member on the projection 213a of the cam 213 so that the projection 213a can be reliably attracted to the magnet 215.

Figure 26:
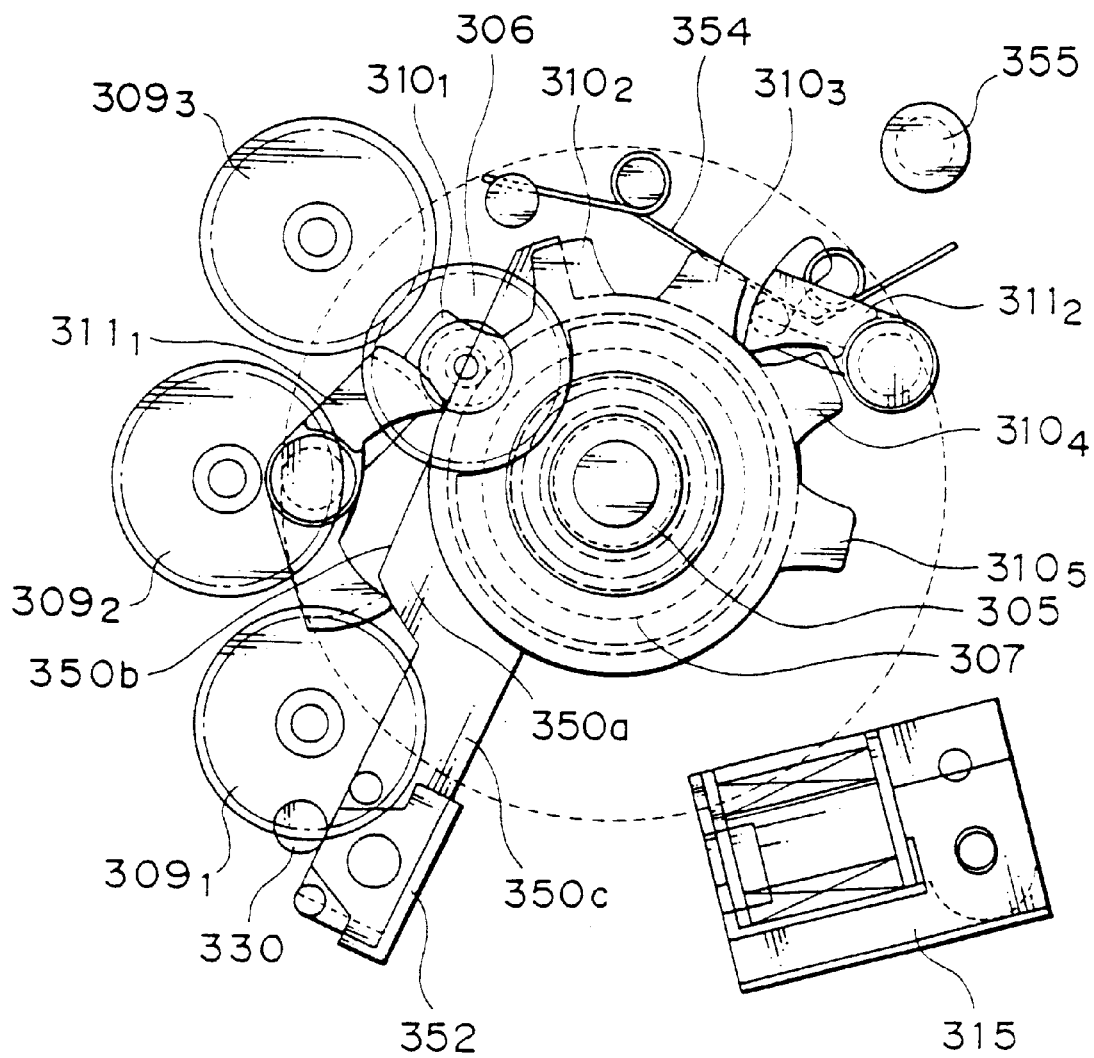
FIG. 26 is an explanatory view showing an actuating mechanism according to a third embodiment of the present invention.
Figure 27:
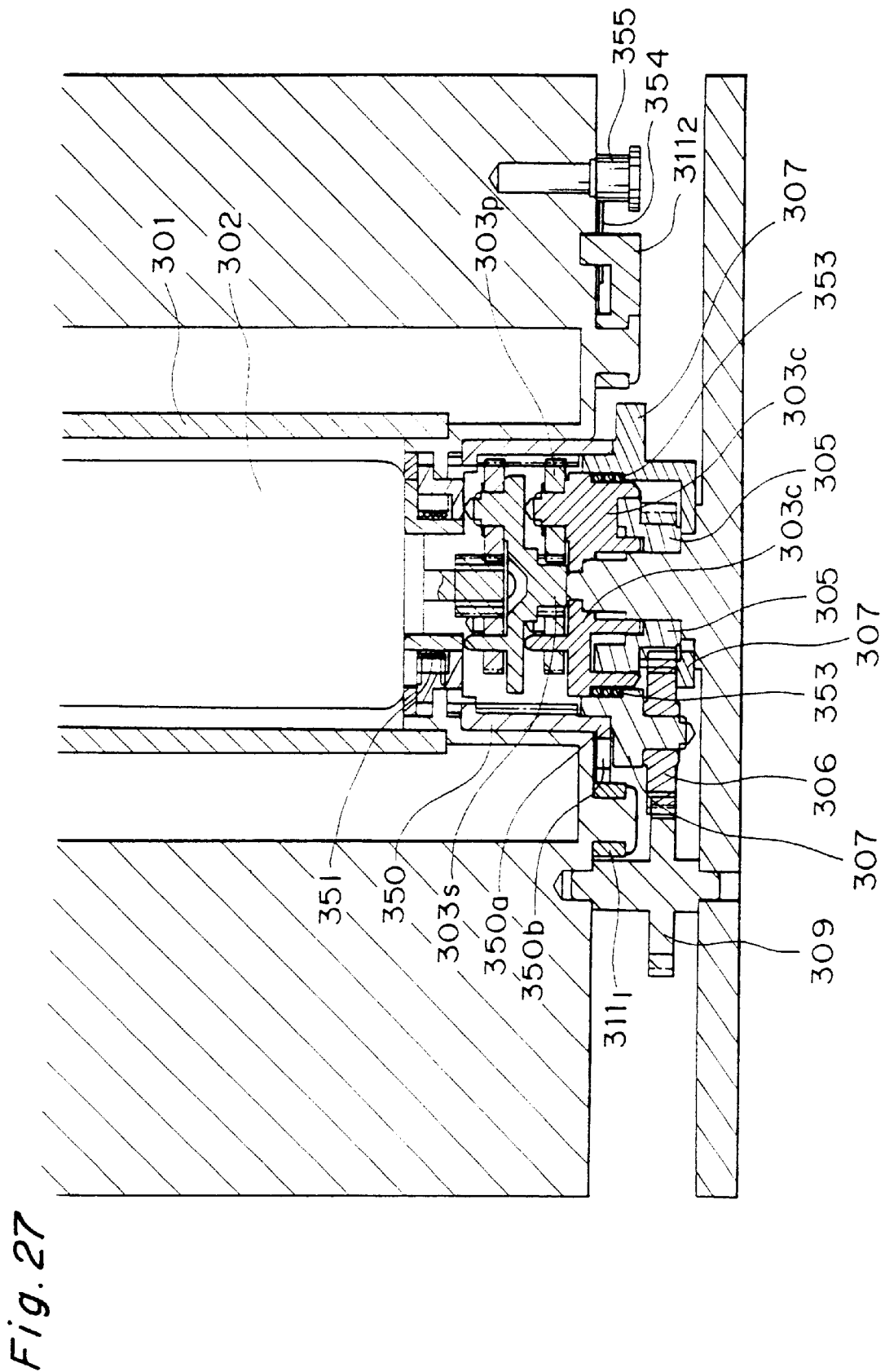
FIG. 27 is a vertical sectional view showing the actuating mechanism shown in FIG. 26.

An actuating mechanism according to a third embodiment is described below with reference to FIGS. 26–30 and FIG. 33. Similarly to the second embodiment, the actuating mechanism comprises a planetary carrier having locking projections, a first locking lever driven by a cam and preventing one directional rotation of the planetary carrier, viz. the rotation of the planetary gear around the sun gear, a second locking lever acting as a ratchet claw for the carrier, a stopper pin for limiting the rotational amount of the cam, and a magnet, in which construction the station gears are changed and the rotational direction of a selected station gear can be reversed. The magnet attracts the cam thereto, thus holding it temporarily. Accordingly, the mechanism of the third embodiment having the same construction and operation as those of the second embodiment are not described below. Unlike the first and second embodiments in which the output shaft of the speed reduction system and the sun gear are connected with each other with a "play" provided to make the cam plate rotate before the sun gear rotates in reversing the rotational direction of the motor, according to the third embodiment, a differential mechanism is provided therein. Referring to FIGS. 26 and 27, a cylindrical peripheral ring gear 350 of a speed reduction system 303 is rotatable. An extended portion 350a extending radially outwardly from the lower end of the peripheral ring gear 350 is formed and a cam surface 350b is integrally formed on the side of the extended portion 350a. In this manner, an integrated construction has the driving cam of a locking lever $311_1$ and the ring gear 350 integral with the driving cam. This construction includes a projection 350c, to be attracted to the magnet 315, extending outward from the extended portion 350a. The rotatable amount of the ring gear 350 is limited to a certain range, and the projection 350c is pivotal between the magnet 315 and a stopper pin 330. A pivotal contact piece 352 is formed on an end of the projection 350c by fixing a shaft thereof to the piece 352 so that the projection 350c can be appropriately attracted to the magnet 315. The ring gear 350 is connected with the camera body with a bayonet so that the ring gear 350 is not disconnected from the camera body in the axial direction thereof (axial direction of spool 301) and allowed to rotate within a predetermined angular range. One end of a helical spring 351 is locked on a boss of the camera body and the other end thereof is locked on the ring gear 350. The helical spring 351 biases the projection 350c so that the ring gear 350 rotates clockwise in FIG. 26. That is, the helical spring 351 biases the ring gear 350 in the direction in which the projection 350c is pressed against the stopper pin 330. A friction spring 353 for rotating a planetary gear 306 round a sun gear 305 is interposed between a carrier 303c of a planetary gear train of the speed reduction system 303 and a planetary carrier 307 of a switching system. The locking lever $311_1$ is driven by the cam surface 350b and another locking lever $311_2$ acts as a ratchet claw permitting the carrier 307 to rotate only counterclockwise. Unlike the first and second embodiments, the locking levers $311_1$, $311_2$ engage a locking projection. As shown in FIG. 26, in the state in which the locking lever $311_1$ is in engagement with a locking projection $310_1$, a slight gap is provided between the locking lever $311_2$ and a locking projection $310_3$. The gap is as small as approximately 4° and allows the locking lever $311_1$ to disengage from the locking projection $310_1$ easily. That is, the carrier 307 rotates clockwise by the length of the gap before the locking lever $311_1$ is disengaged from the locking projection $310_1$. As a result, a slight gap is provided between the locking lever $311_1$ and the locking projection $310_1$, thus allowing the locking lever $311_1$ to disengage easily from the locking projection $310_1$.

Figure 33:
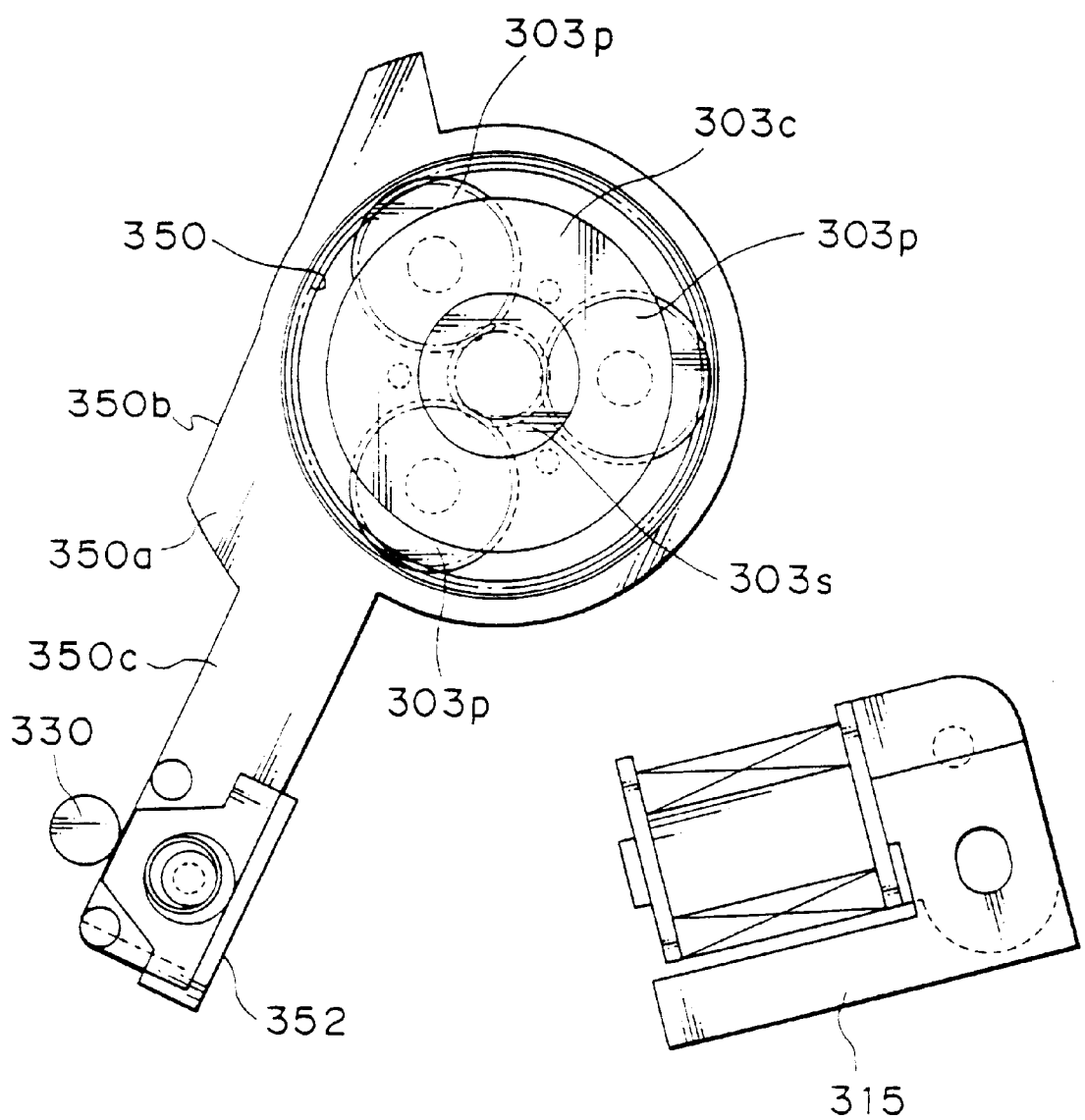
FIG. 33 is an explanatory view showing a differential mechanism provided in the actuating mechanism of FIG. 26.

Next, the differential mechanism comprising the planetary speed reduction system 303 is described below with reference to FIG. 33. In FIG. 33, of two stages of the planetary gear train, only the planetary gear train of the second stage with respect to the motor is shown. But the planetary gear train of the first stage has the same operation as that of the second stage. In the planetary speed reduction system 303, both the carrier 303c of the reduction system and the ring gear 350 are rotatable. When the motor 302 rotates, either carrier 303c of the reduction system or the ring gear 350 rotates according to the magnitude of loads applied thereto with the motor 302 rotating. That is, if the load of the former is greater than the latter, the former rests and the latter rotates, and vice versa. At this time, the rotational force of the motor 302 is transmitted to the carrier 303c in the same rotational direction as that of the motor 302, whereas the rotational force of the motor 302 is transmitted to the ring gear 350 in the rotational direction opposite to that of the motor 302. Accordingly, if the ring gear 350 is fixed when the motor 302 rotates, i.e., when the projection 350c is pressed against the stopper pin 330 or the magnet 315 or attracted to the magnet 315, the carrier 303c of the reduction system 303 rotates round a sun gear 303s of the reduction system together with a planetary gear 303p of the planetary gear train of the reduction system 303. The carrier 303c of the reduction system 303 is coaxially connected with the sun gear 305, with a "play" provided. The carrier 303c of the reduction system 303 is an output shaft of the reduction system 303. When the carrier 303c of the reduction system 303 rotates as described above, the driving force from the motor 302 is transmitted to the planetary gear 306 via the carrier 307 or the sun gear 305. As a result, the planetary gear 306 rotates round the sun gear 305 or rotates on its axis, thus switching stations or transmitting the driving force from the motor 302 to a desired station gear.

Figure 28:
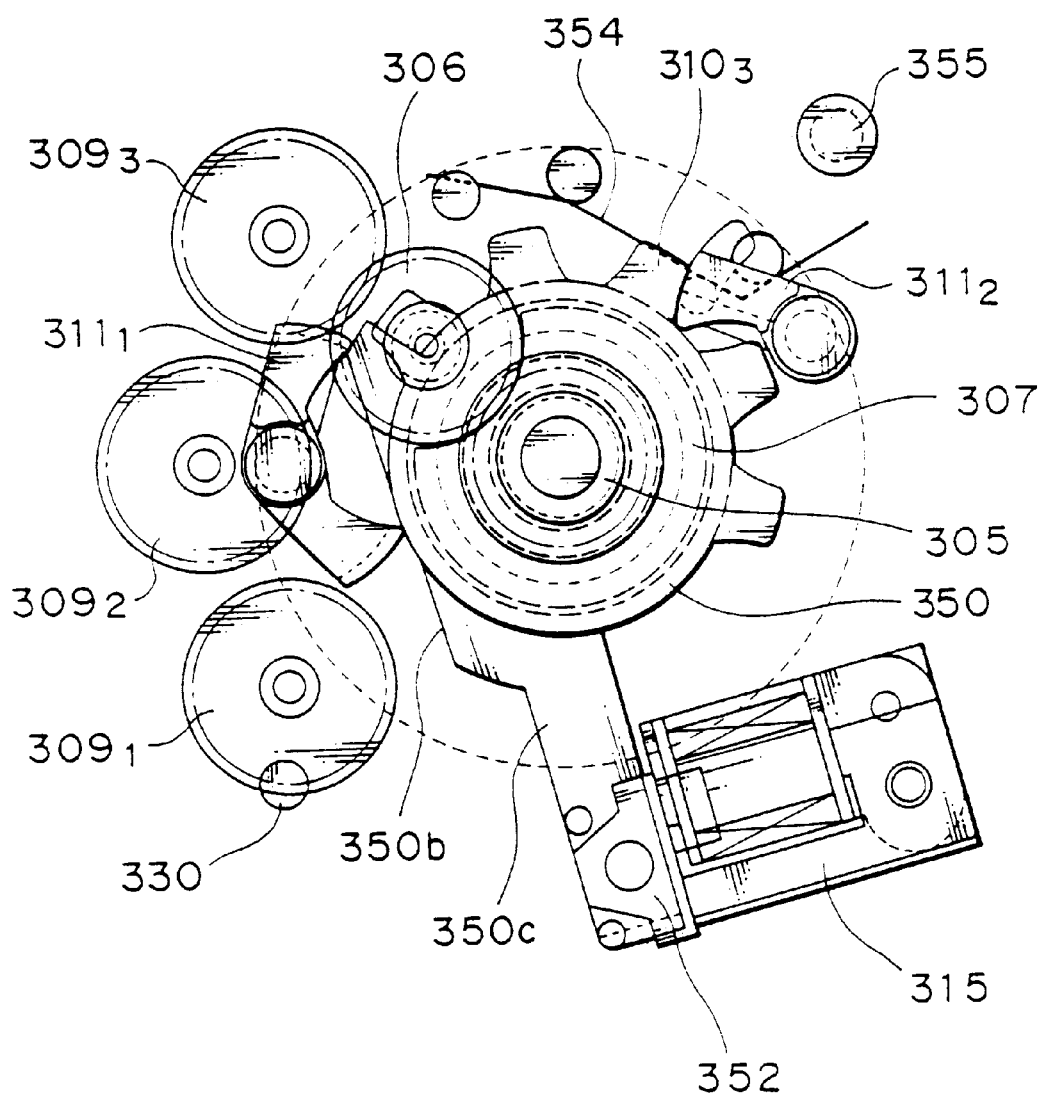
FIG. 28 is an explanatory view showing a forward drive state of the actuating mechanism of FIG. 26.
Figure 29:
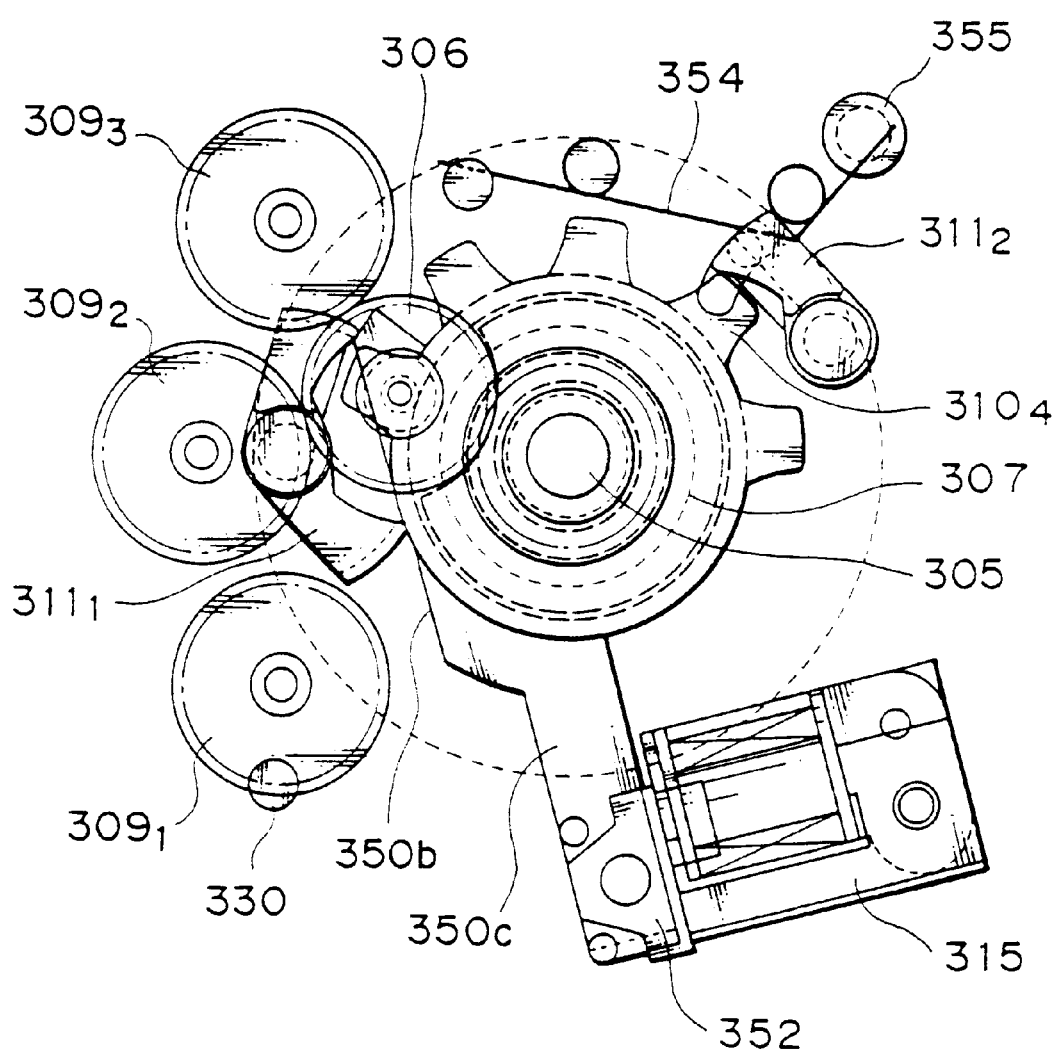
FIG. 29 is an explanatory view showing a ring gear charge state of the actuating mechanism of FIG. 26.
Figure 30:
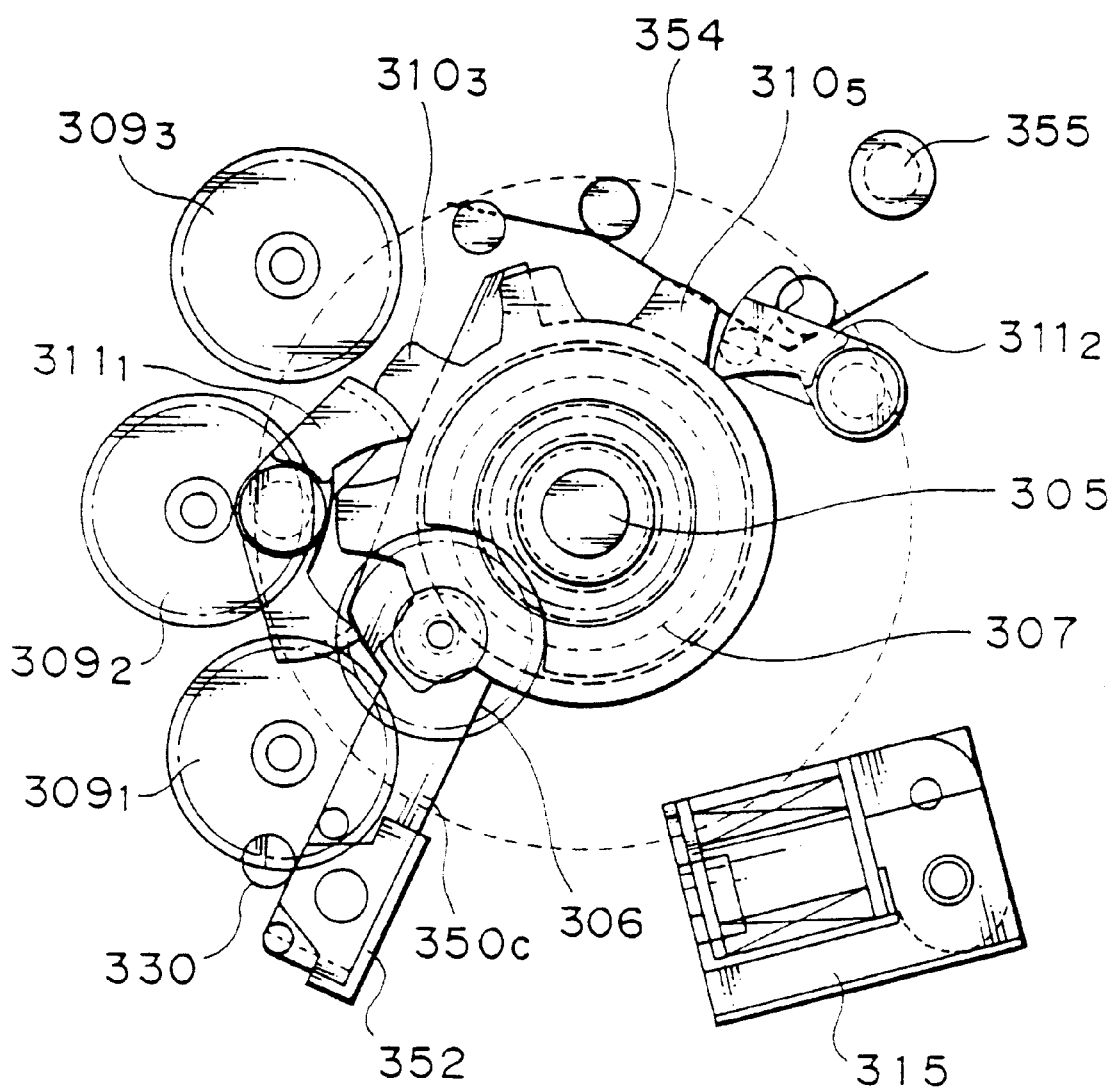
FIG. 30 is an explanatory view showing a backward drive state of the actuating mechanism of FIG. 26.

When the load of the carrier 303c of the reduction system 303 is greater than that of the ring gear 350, the planetary gear 303p of the reduction system 303 rotates on its axis in the direction opposite to the rotational direction of the motor 302, thus rotating the ring gear 350 in the direction opposite to the rotational direction of the motor 302. Referring to FIG. 26 or 28, the operation of reversing the rotational direction of the station gear 309 is described below, supposing that the station gear $309_3$ is driven. When the motor 302 rotates counterclockwise with the state of the actuating mechanism shown in FIG. 26, the sun gear 305 rotates counterclockwise and the locking lever $311_1$ prevents the carrier 307 from rotating counterclockwise. When the planetary gear 306 rotates clockwise on its axis, the station gear $309_3$ rotates counterclockwise. The state in which any one of the station gears 309 is rotated counterclockwise due to the counterclockwise rotation of the motor 302 is referred to as forward drive state. When the motor 302 rotates clockwise in the state shown in FIG. 28, the sun gear 305 also rotates clockwise, and the locking lever $311_2$ prevents the carrier 307 from rotating clockwise. When the planetary gear rotates counterclockwise on its axis, the station gear $309_3$ rotates clockwise. The state in which any one of the station gear 309 is rotated clockwise due to the clockwise rotation of the motor 302 is referred to as backward drive state. To switch the station gear 309 from the forward drive state to the backward drive state, first, the rotational direction of the motor 302 is reversed from the forward drive state to the backward drive state. As a result, the clockwise rotational force of the motor 302 acts on the carrier 307 due to the frictional force of the friction spring 353. Immediately after the rotational direction of the motor 302 is reversed, the locking projection $310_3$ is brought into contact with the locking lever $311_2$, and the carrier 307 is prevented from rotating clockwise. The actuating mechanism has the following operation due to the above-described loads applied to the carrier 303c of the speed reduction system 303 and the ring gear 350: the load exerted on the ring gear 350 with respect to the driving force of the motor 302 is the biasing force of the helical spring 351, and the load applied to the carrier 303c of the reduction system 303 is the frictional force of the friction spring 353 interposed between the carrier 303c of the reduction system 303 and the carrier 307 of the switching system. At this time, the rotation of the carrier 307 is prevented by the locking lever $311_2$. The biasing force of the helical spring 351 is set to be smaller than the frictional force of the friction spring 353. Accordingly, when the rotational direction of the motor 302 is reversed as described above, the driving force of the motor 302 rotates the ring gear 350 counterclockwise against the urging force of the helical spring 351 until the projection 350c is brought into contact with the magnet 315. Until the projection 350c is brought into contact with the magnet 315, the carrier 303c of the reduction system 303, the sun gear 305, and the planetary gear 306 rest. The state that the sun gear 305 and the planetary gear 306 rest with the motor 302 rotating clockwise and the projection 350c in contact with the magnet 315 is referred to as ring gear charge state. The ring gear charge state is also the state in which the preparation for switching the station has been completed, which will be described later. When the motor 302 continues to rotate in the ring gear charge state, and, when the sun gear 305 does not have the "play" any more, the corresponding station gear (station gear $309_3$ in FIG. 28) starts rotating clockwise, with the sun gear 305 rotating clockwise together with the motor 302, the locking lever $311_2$ preventing the carrier 307 from rotating clockwise, and the planetary gear 306 rotating counterclockwise. That is, the station gear $309_3$ is in the backward drive state.

Description is made on the above-described loads applied to the carrier 303c of the reduction system 303 and the ring gear 350 at the time when the rotational direction of the motor 302 is switched to the counterclockwise direction so as to switch the backward drive state to the forward drive state. When the motor 302 is rotated counterclockwise, the clockwise driving force acts on the ring gear 350. The biasing force of the helical spring 351 is applied clockwise to the ring gear 350. That is, a negative load is applied to the ring gear 350 because the motor 302 is rotated counterclockwise. The driving force is applied counterclockwise to the carrier 303c of the reduction system 303. In this state, the planetary carrier 307 is not prevented from counterclockwise rotation round the sun gear 305; therefore, the carrier 303c of the speed reduction system 303 allows the carrier 307 to rotate with no load applied to the carrier 303c in rotating the planetary gear 306 round the sun gear 305 by means of the frictional force of the friction spring 353. That is, the driving force of the motor 302 rotates the ring gear 350 clockwise due to the balance between the negative load and no-load until the projection 350c is brought into contact with the stopper pin 330. At this time, the locking lever $311_1$ is driven by the cam surface 350b formed on the ring gear 350, thus taking a position at which the carrier 307 is prevented from rotating counterclockwise. The carrier 303c of the speed reduction system 303, the carrier 307, the sun gear 305, and the planetary gear 306 rest during the period of time between the time at which the motor 302 has reversed its rotational direction and the time at which the projection 350c contacts the stopper pin 330. When the motor 302 keeps rotating and the sun gear 305 has no "play", the sun gear 305 rotates counterclockwise together with the motor 302. At this moment, the locking lever $311_1$ prevents the carrier 307 from rotating counterclockwise, the planetary gear 306 starts rotating clockwise, and the corresponding station gear (station gear $309_3$ in FIG. 26) is rotated counterclockwise. That is, the station gear $309_3$ is set to the forward drive state.

The operation of switching the station is described below. In the third embodiment, the switch-over of the station starts from the ring gear charge state. Thus, in case of trying to switch the station with the forward drive state, the forward drive state is once shifted to the ring gear charge state as described above. The magnet 315 is energized in the ring gear charge state so that the projection 350c, namely, the ring gear 350 is attracted thereto. The motor 302 is rotated counterclockwise to rotate the carrier 303c of the speed reduction system 303 counterclockwise. At this time, the locking lever $311_1$ allows the carrier 307 to rotate counterclockwise. Because the carrier 303c of the reduction system 303 and the carrier 307 are connected with each other by the friction spring 353, the carrier 307 rotates counterclockwise, and thus the planetary gear 306 is switched to another station gear 309. At this time, the locking lever $311_2$ is pushed outward by the locking projection 310. The locking lever $311_2$ is biased toward the carrier 307 by a spring 354 serving as a switch contact strip and outputting an ON-signal in contact with a switch pin 355 each time the locking lever $311_2$ is pushed by the locking projection 310. Similarly to the second embodiment, the number of the station gears 309 which the planetary gear 306 passes is counted by counting the number of the ON-signals. When the magnet 315 is deenergized as the planetary gear 306 approaches to a position immediately before a predetermined station gear 309, the ring gear 350 is released from the magnet 315. The ring gear 350 rotates clockwise due to the biasing force of the helical spring 351 and the rotation of the motor 302, and the cam surface 350b of the ring gear 350 locks the locking lever $311_1$. Accordingly, the carrier 307 is prevented from rotating counterclockwise, and the planetary gear 306 engages the predetermined station gear 309 (see FIG. 30). At this time, there is the "play" left between the sun gear 305 and the carrier 303c of the speed reduction system 303, and the sun gear 305 does not start to rotate. When the motor 302 continues to rotate counterclockwise, the actuating mechanism operates with the forward drive state after the "play" is removed, whereas when the rotational direction of the motor 302 is reversed, the actuating mechanism operates with the backward drive state after passing the ring gear charge state. That is, in the state immediately after the station is switched, both the sun gear 305 and the planetary gear 306 rest even though the motor 302 rotates a bit excessively, thus avoiding any unexpected driving state, no matter whether it is in the forward drive state or in the backward drive state. The "play" also overcomes a possibility that an unexpected station gear (station gear $309_2$ in the above example) is driven while the planetary gear 306 is moving toward one desired station gear. Furthermore, the "play" avoids a possibility of getting the backward drive state due to an overrun of the motor 302 in case that it is once set in the ring gear charge state in order to switch the station with the forward drive state kept. The function of the "play" for preventing the station from being driven unexpectedly in reversing the control cam (cam surface 350b) for switching the station holds true for the first and second embodiments.

The film-rewinding mechanism according to the third embodiment, which is not described above, can be constructed similarly to the second embodiment, for example, by extending the gear train of the film-rewinding mechanism from the station gear $309_2$ along the bottom surface of the camera body.

Figure 31:
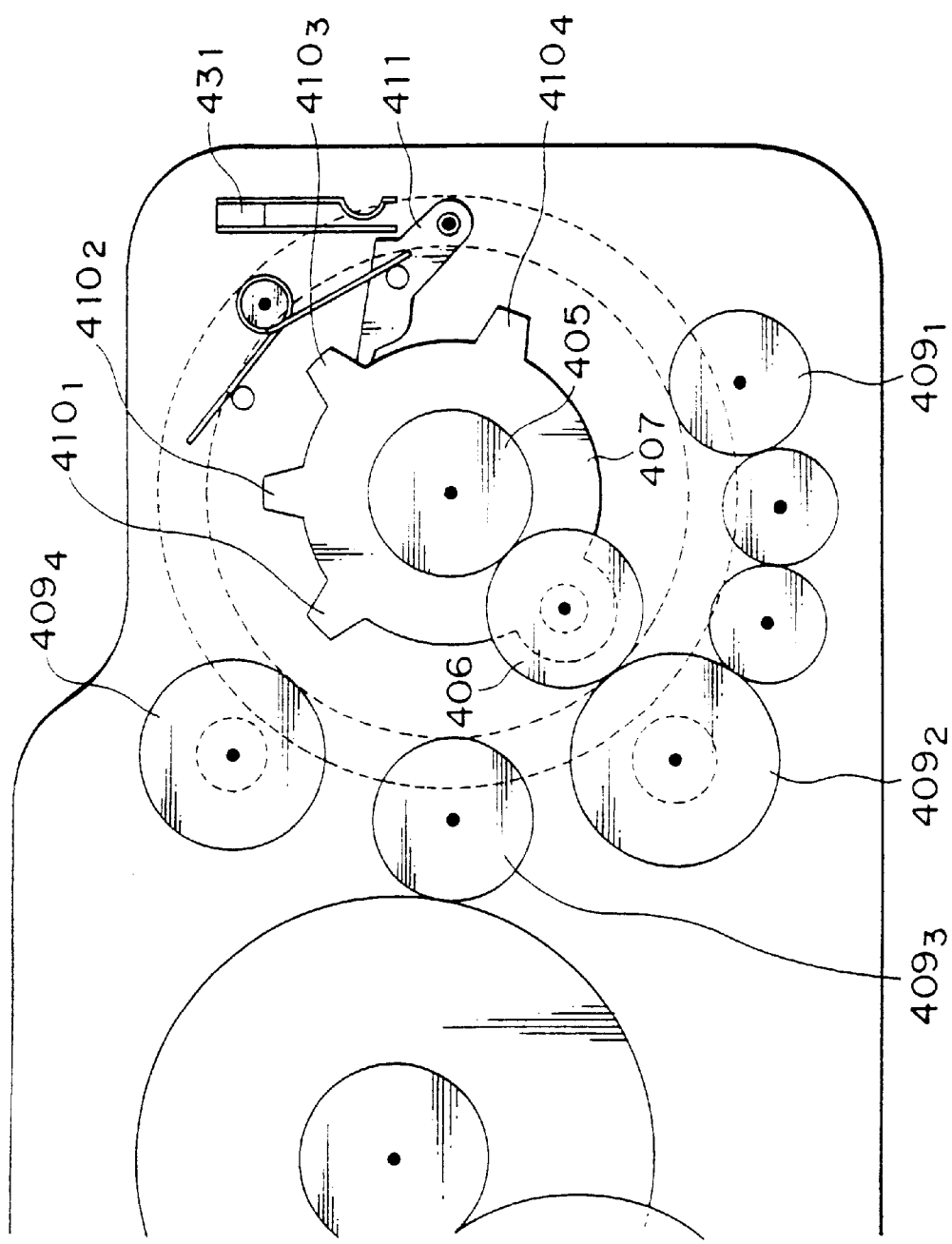
FIG. 31 is an explanatory view showing a modification of the actuating mechanism, according to the present invention, in which any one of station gears can be driven to rotate only in one rotational direction.

In each embodiment described above, the station gears can be rotated in two rotational directions. If it is desired that each station gear is rotated only in one rotational direction, the actuating mechanism can be made simple in construction. That is, the actuating mechanism can be constructed such that one locking lever 411 provided therein acts as a ratchet claw allowing the planetary carrier 407 to rotate only in one rotational direction as shown in FIG. 31. In an example shown in FIG. 31, even if the sun gear 405 rotates clockwise, the rotation of the planetary carrier 407 is prevented by the locking lever 411. Therefore, a planetary gear 406 rotates on its axis counterclockwise, thus rotating the station gears 409 clockwise. On the other hand, when the sun gear 405 rotates counterclockwise, the planetary carrier 407 is able to rotate, pushing the locking lever 411 radially outwardly. As a result, the planetary gear 406 rotates counterclockwise round the sun gear 405. The planetary gear 406 can be switched to a desired station gear 409 based on the number of ON-signals outputted from a switch 431. It is possible to use a photoreflector or a photointerrupter, instead of the switch 431, similar to those used in the first embodiment.

Station gears $409_1$ and $409_2$ sandwiching two idle gears in between them are rotated in opposite rotational directions by a common driving system, and they allow zooming operation to be performed from the telescopic side to the wide side or vice versa. It is also possible to adopt a one-direction clutch mechanism having a known construction instead of a ratchet mechanism having a locking lever 411.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An actuating mechanism comprising:
    a driving source with a driving shaft able to rotate in both rotational directions;
    a sun gear driven by the driving shaft;
    a planetary carrier mounted rotatably with respect to the sun gear;
    a planetary gear, engaging with the sun gear, which is frictionally mounted on the planetary carrier, such that friction is generated between the planetary gear and the planetary carrier, so as to revolve around the sun gear;
    at least one transmission gear, located along an orbital path of the planetary gear, which can engage with the planetary gear; and
    a control mechanism which switches between a first state in which the planetary gear is allowed to revolve along the orbital path, and a second state in which the planetary gear is allowed to rotate on its axis but not allowed to revolve along the orbital path, wherein the control mechanism is driven by the driving shaft of the driving source.

2. An actuating mechanism as claimed in claim 1, wherein the control mechanism includes means for prohibiting the planetary gear from revolving along the orbital path in both directions.

3. An actuating mechanism as claimed in claim 1, wherein the at least one transmission gear can be driven to rotate in both rotational directions.

4. An actuating mechanism comprising:
    a driving source with a driving shaft able to rotate in both rotational directions;
    a sun gear driven by the driving shaft;
    a planetary carrier mounted rotatably with respect to the sun gear;
    a planetary gear, engaging with the sun gear, which is frictionally mounted on the planetary carrier so as to revolve around the sun gear;

at least one transmission gear, located along an orbital path of the planetary gear, which can engage with the planetary gear;

a control mechanism which switches between a first state in which the planetary gear is allowed to revolve along the orbital path, and a second state in which the planetary gear is allowed to rotate on its axis but not allowed to revolve along the orbital path, wherein the control mechanism is driven by the driving shaft of the driving source;

a magnet for controlling the control mechanism so that the control mechanism is kept in the first state;

wherein the control mechanism has a part which is magnetically pulled by the magnet; and the control mechanism is so controlled that the control mechanism is kept in the first state with the part of the control mechanism being magnetically pulled by the magnet.

5. An actuating mechanism comprising:

a driving source with a driving shaft able to rotate in both rotational directions;

a sun gear driven by the driving shaft;

a planetary gear, engaging with the sun gear, which can revolve around the sun gear and rotate on its axis at a desired position along an orbital path taken around the sun gear;

at least one transmission gear, located along the orbital path of the planetary gear, which can engage with the planetary gear;

a first control mechanism which switches between a first state in which the planetary gear is allowed to revolve along the orbital path, and a second state in which the planetary gear is allowed to rotate on its axis but not allowed to revolve along the orbital path; and a second control mechanism for controlling the first control mechanism so that the first control mechanism is kept in the first state;

wherein the first control mechanism is driven by the driving shaft of the driving source.

6. An actuating mechanism as claimed in claim 5, wherein the first control mechanism includes means for prohibiting the planetary gear from revolving around the orbital path in both directions.

7. An actuating mechanism as claimed in claim 5, wherein at least one transmission gear can be driven to rotate in both rotational directions.

8. An actuating mechanism comprising:

a driving source with a driving shaft able to rotate in both rotational directions;

a sun gear driven by the driving shaft;

a planetary gear, engaging with the sun gear, which can revolve around the sun gear and rotate on its axis at a desired position along an orbital path taken around the sun gear;

at least one transmission gear, located along the orbital path of the planetary gear, which can engage with the planetary gear;

a first control mechanism which switches between a first state in which the planetary gear is allowed to revolve along the orbital path, and a second state in which the planetary gear is allowed to rotate on its axis but not allowed to revolve along the orbital path;

a second control mechanism for controlling the first control mechanism so that the first control mechanism is kept in the first state;

wherein the second control mechanism is a magnet; and the first control mechanism has a part which is magnetically pulled by the magnet, and the first control mechanism is so controlled that the first control mechanism is kept in the first state such that the planetary gear may revolve around the orbital path only when the part thereof is magnetically pulled by the magnet.

9. An actuating mechanism comprising:

a motor with a driving shaft able to rotate in both rotational directions;

a sun gear driven by the driving shaft;

a planetary gear, engaging with the sun gear, which can revolve around the sun gear and rotate on its axis at a desired position along an orbital path taken around the sun gear;

at least one transmission gear, located along the orbital path of the planetary gear, which can engage with the planetary gear;

a locking mechanism which prohibits the planetary gear from revolving along the orbital path, wherein the locking mechanism comprises a movable first locking member which can prohibit the planetary gear from revolving along the orbital path in one orbital direction, the locking member further comprises a movable second locking member which is movable relative to the first locking member and which can prohibit the planetary gear from revolving along the orbital path in another orbital direction.

10. An actuating mechanism as claimed in claim 9, wherein at least one of the first locking member and the second locking member has a locking state in which the planetary gear is prohibited from revolving along the orbital path, and an unlocking state in which the planetary gear is allowed to revolve along the orbital path.

11. An actuating mechanism as claimed in claim 10, further comprising an actuator for keeping the locking member in the unlocking state.

12. An actuating member as claimed in claim 11, wherein the actuator is a magnet.

13. An actuating mechanism as claimed in claim 11, wherein the locking member is switched between the locking state and the unlocking state by the actuator.

14. An actuating mechanism as claimed in claim 9, wherein there are provided at least three transmission gears.

15. An actuating mechanism as claimed in claim 9, wherein a rotational direction of the driving shaft of the motor during a revolution of the planetary gear around the sun gear is different from a rotational direction of the driving shaft thereof before the revolution of the planetary gear around the sun gear is started.

16. An actuating mechanism as claimed in claim 9, further comprising a planetary carrier, rotatably mounted with respect to the sun gear, on which the planetary gear is frictionally mounted so as to revolve around the sun gear.

17. An actuating mechanism comprising:

a motor with a driving shaft able to rotate in both rotational directions;

a sun gear driven by the driving shaft of the motor;

a planetary gear, engaging with the sun gear, which can revolve around the sun gear and rotate on its axis at a desired position along an orbital path taken around the sun gear;

at least one transmission gear, located along the orbital path of the planetary gear, which can engage with the planetary gear; and a locking member which can prohibit the planetary gear from revolving along the orbital path, wherein the locking member comprises a first locking member which can prohibit the planetary gear from revolving along the orbital path in one orbital direction, the locking member further comprises a second locking member which can prohibit the planetary gear from revolving along the orbital path in another orbital direction;

wherein at least one of the first locking member and the second locking member is driven by the motor so that the locking member moves between a locking state in which the planetary gear is prohibited from revolving along the orbital path and an unlocking state in which the planetary gear is allowed to revolve along the orbital path.

18. An actuating mechanism as claimed in claim 17, further comprising an actuator for keeping the locking member in the unlocking state.

19. An actuating mechanism as claimed in claim 18, wherein the actuator is a magnet.

20. An actuating mechanism as claimed in claim 17, wherein there are provided at least three transmission gears.

21. An actuating mechanism as claimed in claim 17, wherein a rotational direction of the driving shaft of the motor during a revolution of the planetary gear around the sun gear is different from a rotational direction of the driving shaft thereof before the revolution of the planetary gear around the sun gear is started.

22. An actuating mechanism, comprising:

a motor with a driving shaft able to rotate in both rotational directions;

a sun gear driven by the driving shaft of the motor;

a planetary gear, engaging with the sun gear, which can revolve around the sun gear and rotate on its axis at a desired position along an orbital path taken around the sun gear;

at least one transmission gear, located along the orbital path of the planetary gear, which can engage with the planetary gear; and a locking member which can prohibit the planetary gear from revolving along the orbital path, wherein the locking member comprises a first locking member which can prohibit the planetary gear from revolving along the orbital path in one orbital direction, the locking member further comprises a second locking member which can prohibit the planetary gear from revolving along the orbital path in another orbital direction, wherein at least one of the first locking member and the second locking member has a locking state in which the planetary gear is prohibited from revolving along the orbital path and an unlocking state in which the planetary gear is allowed to revolve along the orbital path, wherein a rotational direction of the motor at a time of revolution of the planetary gear along the orbital path is reverse with respect to a rotational direction of the motor just before the revolution of the planetary gear along the orbital path.

23. An actuating mechanism as claimed in claim 22, further comprising an actuator for switching the locking member between the locking state and the unlocking state.

* * * * *